United States Patent
Augeri et al.

[11] Patent Number: 6,166,381
[45] Date of Patent: Dec. 26, 2000

[54] UNCOOLED BACKGROUND LIMITED DETECTOR AND METHOD

[75] Inventors: Richard C. Augeri, West Hempstead; Ronald A. Lange, Huntington; Richard T. Knadle, Dix Hills, all of N.Y.

[73] Assignee: AIL Systems, Inc., Deer Park, N.Y.

[21] Appl. No.: 09/055,773

[22] Filed: Apr. 6, 1998

Related U.S. Application Data

[63] Continuation of application No. 08/690,238, Jul. 19, 1996, Pat. No. 5,811,807.

[51] Int. Cl.[7] .................................................. H01J 25/00
[52] U.S. Cl. ........................................... 250/332; 250/330
[58] Field of Search ..................... 250/332, 330, 250/338.1, 339.01; 374/205

[56] References Cited

U.S. PATENT DOCUMENTS

| | | | |
|---|---|---|---|
| 3,415,712 | 12/1968 | Barker, Jr. | 250/338.1 |
| 3,896,309 | 7/1975 | Halsor et al. | 250/370 |
| 4,788,428 | 11/1988 | Metcalf et al. | 250/332 |
| 5,436,452 | 7/1995 | Kenny et al. | 250/338.1 |
| 5,550,516 | 8/1996 | Burns et al. | 331/65 |
| 5,623,147 | 4/1997 | Baert et al. | 250/338.1 |

FOREIGN PATENT DOCUMENTS

WO 94/06002  3/1994  WIPO .............. G01N 27/22

OTHER PUBLICATIONS

Barnes et al, "Photothermal Spectroscopy with Femtojoule Sensitivity using a micromechanical Device" Nature vol. 372 No. 3 p. 79, Nov. 1994.

*Primary Examiner*—Seungsook Ham
*Assistant Examiner*—Richard Hanig
*Attorney, Agent, or Firm*—Hoffmann & Baron, LLP

[57] ABSTRACT

A detector for detecting radiant energy includes at least one detecting element and a detector readout element. The at least one detecting element substantially absorbs the radiant energy and exhibits a structural change in response thereto. The detector readout element, positioned in non-contacting proximity to the at least one detecting element, is responsive to the structural change of the at least one detecting element. The non-contacting detector readout element provides an indication signal corresponding to the structural change, whereby the corresponding indication signal is representative of the radiant energy detected by the at least one detecting element.

2 Claims, 9 Drawing Sheets

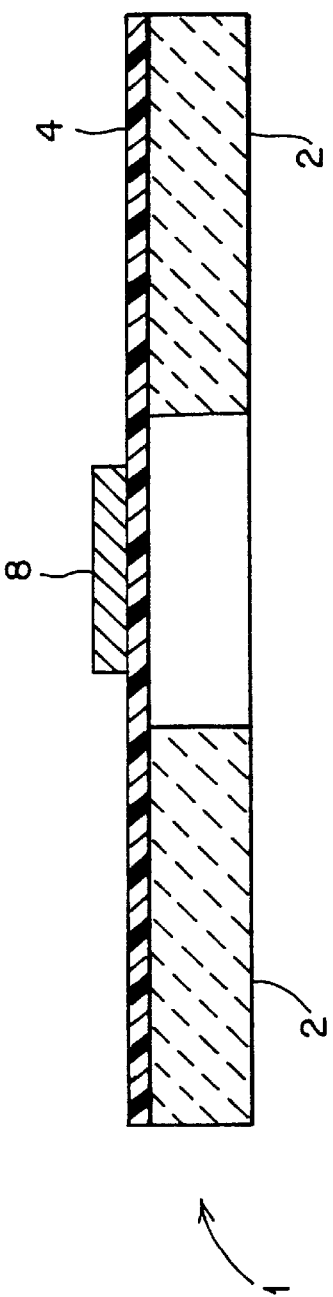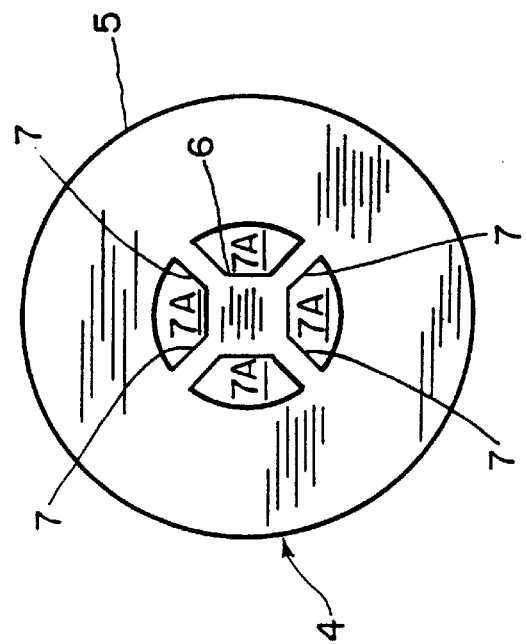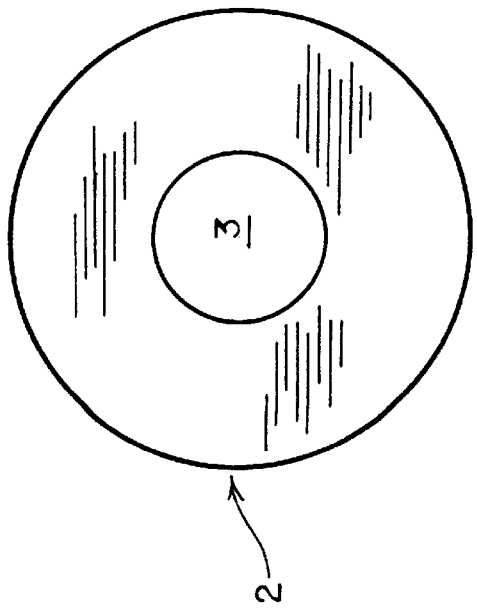
FIG. 1
FIG. 3
FIG. 2

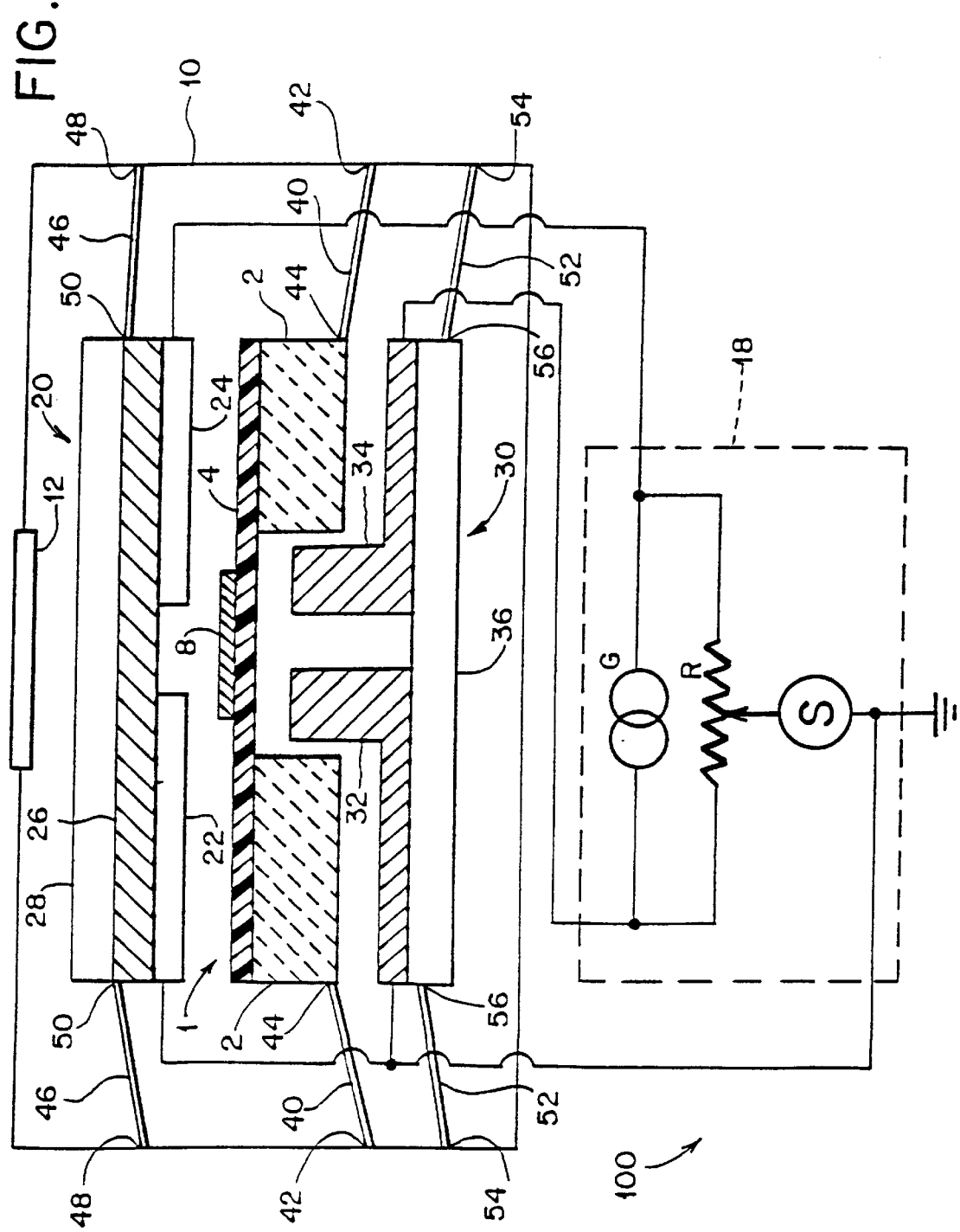

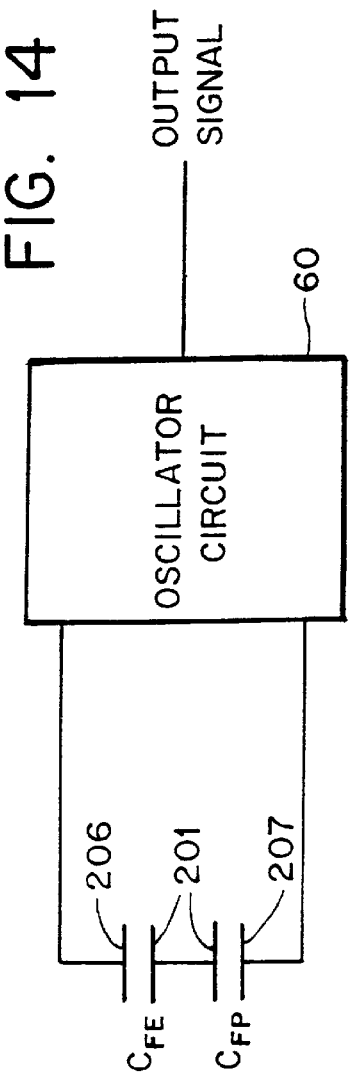
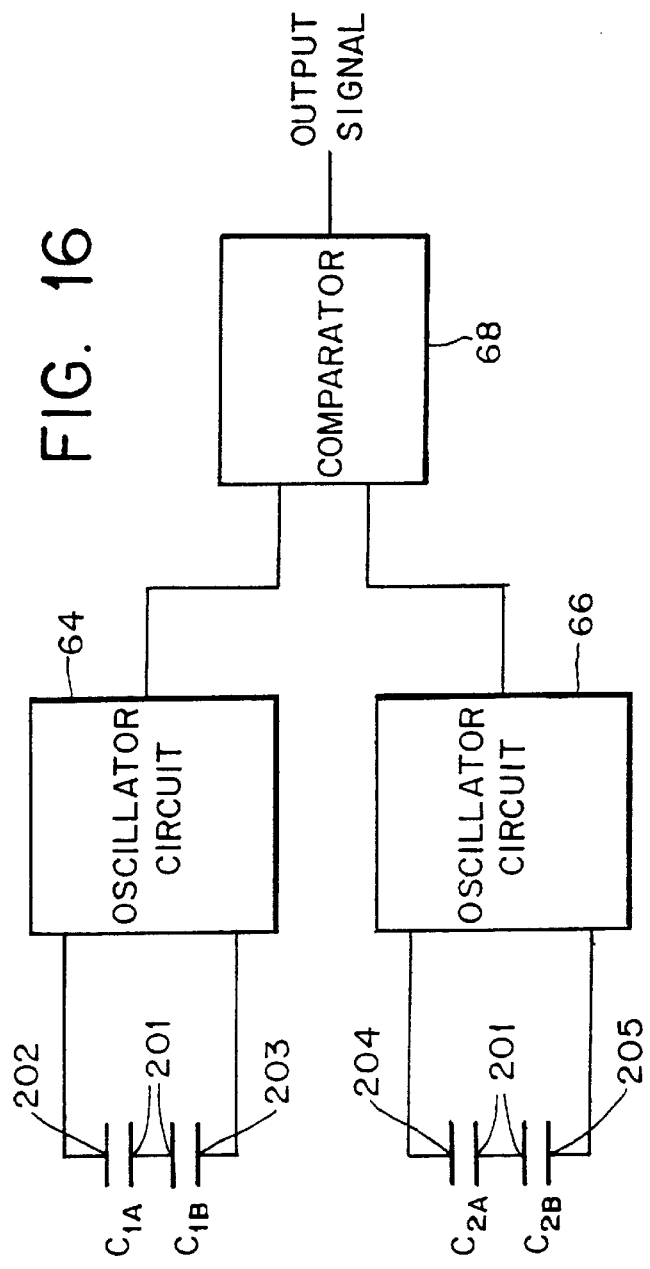

UNCOOLED BACKGROUND LIMITED DETECTOR AND METHOD

CROSS REFERENCE TO RELATED APPLICATIONS

This application is a continuation of Ser. No. 08/690,238, filed on Jul. 19, 1996 now U.S. Pat. No. 5,811,807.

BACKGROUND OF THE INVENTION

1. Field of the Invention

The present invention relates to radiant energy detectors, and more particularly relates to uncooled background limited detectors and methods for detecting radiant energy utilizing uncooled background limited detectors.

2. Description of the Prior Art

The figure of merit for a radiant energy detector is considered to be the detector's sensitivity (i.e., detectivity). Detectivity, symbolically denoted as $D^*$, is measured in $cm-Hz^{1/2}/W$. In relation to other detectors, a detector with a higher $D^*$ is able to detect smaller quantities of energy, in various forms, making the detector useful in a variety of applications. However, prior art radiant energy detectors seeking to achieve a high degree of sensitivity have required the use of costly cryogenic cooling systems associated with detecting smaller quantities of energy. For example, a prior art detector such as the mercury-cadmium-tellerium (HgCdTe) detector is required to be cooled with liquid nitrogen or mechanical coolers to a temperature of 80 degrees Kelvin in order to achieve a high degree of sensitivity. Such cooled detectors are not only expensive but also are limited in the duration of time that they can operate which, in turn, disadvantageously affects the detection capability of the detector. Likewise, such prior art cooled detectors are known to suffer reliability problems due to the maintenance cycle associated with mechanical coolers.

In addition, detector sensitivity and, thus, the performance of a radiant energy detector, is affected by whether or not the detector is background limited. Background limited performance (BLIP) is a desirable attribute for a detector to possess because such a BLIP detector has the best achievable sensitivity. Detectors that are not background limited suffer from the introduction of other noise, such as Johnson noise, which is a limiting factor in the performance of the detector.

There have been many efforts to develop high sensitivity uncooled detectors. Such prior art designs have included the combination of several individual detectors to form a focal plane array. There have been several notable developments in this area such as the microbolometer array developed by Loral/Honeywell and the ferroelectric array developed by Texas Instrument. These efforts have resulted in focal plane arrays having a $D^*$ of approximately $2\times10^8$ $cm-Hz^{1/2}/W$ to $4\times10^8$ $cm-Hz^{1/2}/W$.

Attempts to achieve high sensitivity in single element detectors have been the object of work carried out by AIL Systems, Inc. of Deer Park, N.Y. AIL Systems, assignees of the present invention, has fabricated a metal-oxide-metal tunnel diode (MOMTD) on a 1000 Å (angstrom) $SiO_2$ membrane. Initial experiments and analyses indicate that a $D^*$ of $10^9$ was achievable for a MOMTD on a membrane for a detector bandwidth of 300 Hz. However, the limiting factor with respect to the detector sensitivity was found to be the thermal conductance associated with the contact leads of the MOMTD. This was due to the fact that thermal fluctuation associated with the thermal conductance of the contact leads was a source of noise which, in turn, severely degraded the performance of these prior art detectors.

OBJECTS AND SUMMARY OF THE INVENTION

It is an object of the present invention to provide an uncooled background limited detector that is capable of achieving a detector sensitivity, in the mid to far infrared spectral region, that is as close as possible to the ideal (theoretical) value of approximately $1.8\times10^{10}$ $cm-Hz^{1/2}/W$.

It is another object of the present invention to provide an uncooled background limited detector with improved sensitivity that can be employed in the areas of thermal imaging, surveillance and laser detection.

It is yet another object of the present invention to provide an uncooled background limited detector that does not employ contact leads between the detecting element and the detector readout.

It is a further object of the present invention to provide an uncooled background limited detector that utilizes a non-contacting capacitive readout.

It is still a further object of the present invention to provide an uncooled background limited detector that utilizes a non-contacting differential capacitive readout.

It is a further object of the present invention to provide an uncooled BLIP detector that utilizes the change in non-contacting capacitance to change the frequency of oscillation of an associated oscillator circuit and/or oscillator circuits.

It is yet another object of the present invention to provide an uncooled background limited detector that utilizes a non-contacting optical readout.

It is still a further object of the present invention to provide uncooled background limited focal plane arrays.

In accordance with one form of the present invention, a detector for detecting radiant energy includes at least one detecting element. The at least one detecting element substantially absorbs the radiant energy and, in response, exhibits a structural change. It is to be appreciated that this structural change may include the linear expansion and subsequent sag that the detecting element experiences, as will be described in detail herein. The detector also includes a detector readout element. The detector readout element is positioned in non-contacting proximity to the at least one detecting element. The detector readout element is responsive to the structural change experienced by the at least one detecting element and provides a corresponding indicator. The corresponding indicator is representative of the radiant energy detected by the at least one detecting element.

In accordance with another form of the present invention, a detector for detecting radiant energy includes an enclosure, the enclosure having a window for receiving and passing the radiant energy therethrough. The detector also includes a thermally insulated substrate. The thermally insulated substrate is mounted in the enclosure and has an opening passing therethrough. Further, the detector includes a membrane which is placed on the thermally insulated substrate, thus causing the membrane to be suspended over the opening passing through the thermally insulated substrate. Still further, the detector includes a metal film, the metal film having a surface resistance associated therewith. The metal film is deposited on the membrane and is responsive to radiant energy incidentally introduced through the window of the enclosure. The metal film substantially absorbs the incident radiant energy and, as a result of a rise in temperature, transfers heat to the membrane causing the membrane to experience a corresponding linear expansion and a subsequent sagging. Lastly, the detector includes means for measuring the sagging of the membrane. The measuring means is in non-contacting proximity to the membrane and measures the sagging, thus providing a corresponding indication, e.g. indication signal. The indication signal is representative of the radiant energy absorbed by the metal film. It is to be understood that the measuring means, particularly in the preferred form of a capacitance measuring circuit and an optical measuring device, discussed below, function as the detector readout element previously mentioned.

It is to be appreciated that, in a preferred embodiment, the thermally insulated substrate is composed of low expansion ceramic quartz or Zerodor™ material. The ceramic quartz is preferably in the form of thin quartz plates. Further, in a preferred embodiment, the membrane is composed of lead fluoride having a thickness of approximately 1000 angstroms (Å). It is to be appreciated that, in alternative embodiments, the membrane may be composed of a polymer, preferably a copolymer, or may be composed of one of the thermally expansive materials selected from the group essentially consisting of zinc sulfide, silicon dioxide and silicon nitride, or their equivalents. Still further, it is also to be understood that the metal film preferably has a surface resistance of approximately 189 ohms/square.

Additionally, in a preferred embodiment of the present invention, the measuring means of the detector includes a differential capacitance measuring circuit. The differential capacitance measuring circuit includes first, second, third and fourth capacitors and a differential bridge measurement circuit. The first capacitor is formed by, and thereby includes, a first electrode and the metal film whereby the first electrode is in non-contacting proximity to the metal film. Similarly, the second capacitor is formed by, and thereby includes, a second electrode and the metal film whereby the second electrode is located adjacent to the first electrode and is also in non-contacting proximity to the metal film. Further, the third capacitor is formed by, and thereby includes, a third electrode and the metal film whereby the third electrode is located in non-contacting proximity to the metal film, opposite the first electrode, and between the metal film and the enclosure window. Still further, the fourth capacitor is formed by, and thereby includes, a fourth electrode and the metal film whereby the fourth electrode is located in non-contacting proximity to the metal film, opposite the second electrode, and between the metal film and the enclosure window. The differential bridge measurement circuit has first, second, third and fourth terminals respectively electrically coupled to the first, second, third and fourth electrodes.

Particularly, the first capacitor and the second capacitor form a first equivalent capacitor having a first equivalent capacitance associated therewith, while the third capacitor and the fourth capacitor form a second equivalent capacitor having a second equivalent capacitance associated therewith. Accordingly, the first equivalent capacitor and the second equivalent capacitor respectively vary, substantially equally and oppositely, in capacitance in response to the sagging of the membrane. The differential bridge measurement circuit is responsive to the variation in capacitance of the first and second equivalent capacitors and measures the variation in capacitance thereby providing an indication which is representative of the radiant energy detected by the detector.

Further, another embodiment of the capacitance measuring approach includes a non-differential capacitance measuring circuit with a first capacitor formed by a capacitive probe and the metal film and a second capacitor formed by the detector enclosure and the metal film. Again, it is to be appreciated that the readout means are in non-contacting proximity to the detecting element, particularly, the metal film.

Additionally, in yet another embodiment of the present invention, the measuring means may include an arrangement whereby the equivalent capacitors formed as part of the capacitance measuring circuits described above may, instead, form a part of the resonating circuit of an oscillator. In this manner, the frequency of oscillation of the oscillator changes as the capacitance of the equivalent capacitors changes in response to the detecting element absorbing radiant energy. Accordingly, the oscillation frequency of the oscillator is directly indicative of the amount and/or type of radiant energy detected by the detector. It is to be appreciated that one skilled in the art will realize various forms of oscillator circuits which may be employed in this novel oscillation frequency measurement approach. Several of the preferred forms will be described in greater detail later.

It is also to be appreciated that a plurality of detectors utilizing either the differential capacitance measuring circuit or the non-differential capacitance measuring circuit may operate to form a focal plane array for detecting radiant energy associated with a thermal scene. Also, a focal plane array employing the above-mentioned oscillator frequency approach may be formed to provide a representation of the thermal scene. It is to be appreciated that each detector of the focal plane array generates one pixel of the thermal scene being imaged by the present invention. A plurality of pixels then provides the representation of the thermal scene.

Still further, in an alternative embodiment of the detector formed in accordance with the present invention, the measuring means may preferably include an optical measuring device. The optical measuring device itself includes a beam splitter, a mirror, a light receiver, a light emitting source, a first lens and a second lens. The beam splitter is positioned at a distance $d_1$ from the metal film, while the mirror is positioned at a distance $d_2$ from the beam splitter and perpendicular in relation to the metal film. The light receiver is positioned opposite to the mirror with the beam splitter positioned therebetween. The light emitting source is positioned opposite to the metal film with the beam splitter positioned therebetween. The first lens is positioned between the light emitting source and the beam splitter, while the second lens is positioned between the light receiver and the beam splitter.

Specifically, the beam splitter splits a light beam, the light beam being emitted by the light emitting source and passing through the first lens, into a transmitted beam portion and a reflected beam portion. The transmitted beam portion is transmitted through the beam splitter and strikes the metal film. The transmitted beam portion reflects back towards the beam splitter, whereby the beam splitter then substantially reflects the transmitted beam portion toward the second lens. Further, the reflected beam portion is reflected by the beam splitter and strikes the mirror. The reflected beam portion reflects back toward the beam splitter, whereby the beam splitter then substantially transmits the reflected beam portion toward the second lens.

Subsequently, the transmitted beam portion and the reflected beam portion pass through the second lens and exhibit an interference pattern at the light receiver. It is to be understood that the interference pattern changes in response to a change in difference between the distance $d_1$ and the distance $d_2$. The distance $d_1$ changes, thereby causing a change in difference with respect to the distance $d_2$, as the membrane sags in response to the metal film absorbing the radiant energy. The interference pattern is representative of the radiant energy detected by the detector. Preferably, the light emitting source is monochromatic, and may preferably be in the form of a light emitting diode.

In accordance with yet an other form of the present invention, a system for imaging radiant energy associated with a thermal scene includes a focal plane array, the focal plane array itself including a plurality of uncooled background limited detectors, an imaging lens, a beam splitter, a mirror, a viewing lens, a light emitting source and a focusing lens. The imaging lens is positioned between the focal plane array and the thermal scene. The imaging lens passes the radiant energy associated with the thermal scene to the focal plane array, whereby each one of the plurality of detectors of the focal plane array substantially absorbs the radiant energy passed by the imaging lens and incidentally introduced to the focal plane array. Each one of the plurality of detectors structurally changes in response to the absorption of the incident radiant energy. Again, it should be understood that such a structural change refers to the linear expansion and subsequent sag associated with the membrane and metal film of each one of the plurality of detectors, which will be described in greater detail later.

The beam splitter is positioned in relation to the focal plane array whereby a plurality of distances respectively exits between the beam splitter and the plurality of detectors. The mirror is positioned at a distance d from the beam splitter and is perpendicular in relation to the focal plane array. Further, the viewing lens is positioned opposite to the mirror with the beam splitter positioned therebetween. The light emitting source is positioned opposite to the focal plane array with the beam splitter positioned therebetween. Still further, the focusing lens is positioned between the light emitting source and the beam splitter.

Accordingly, the beam splitter splits a light beam, the light beam being emitted by the light emitting source and passing through the focusing lens, into a transmitted beam portion and a reflected beam portion. The transmitted beam portion is transmitted through the beam splitter and strikes the plurality of detectors. The plurality of detectors respectively reflect a plurality of imaging beams back toward the beam splitter, whereby the beam splitter then substantially reflects the plurality of imaging beams toward the viewing lens. Further, the reflected beam portion is reflected by the beam splitter and strikes the mirror. The reflected beam portion reflects back toward the beam splitter, whereby the beam splitter then substantially transmits the reflected beam portion toward the viewing lens.

Subsequently, the reflected beam portion and the plurality of imaging beams pass through the viewing lens and respectively exhibit a plurality of interference patterns. The plurality of interference patterns form a visual representation of the radiant energy associated with the thermal scene. The plurality of interference patterns change in response to a respective change in difference between the plurality of distances and the distance d. Each one of the plurality of distances respectively changes, thereby causing a change in difference with respect to the distance d, as each one of the plurality of detectors experiences a structural change in response to absorbing the radiant energy associated with the thermal scene. Thus, a person or system observing the thermal scene through the viewing lens is provided with an accurate and updated visual representation of the thermal scene.

In an alternate embodiment of the system for imaging radiant energy associated with a thermal scene formed in accordance with the present invention, it is to be appreciated that a low cost silicon charge coupled device (CCD) array may be utilized to detect and provide a visual representation of the thermal (i.e., infrared) image provided through the viewing lens. Further, it is to be appreciated that a liquid crystal display may be interfaced to the system in order to provide the visual representation.

In accordance with the present invention, a method of constructing a radiant energy detecting element, the radiant energy detecting element including a thermally insulated substrate having an opening passing therethrough, a membrane and a metal film, preferably includes positioning the membrane on the thermally insulated substrate thereby suspending a portion of the membrane over the opening passing through the thermally insulated substrate. Further, the preferred method includes depositing the metal film on the portion of the membrane suspended over the opening passing through the thermally insulated substrate.

Further in accordance with the present invention, another method of detecting radiant energy, utilizing a detector including a thermally insulated substrate having an opening passing therethrough, a membrane, a metal film and non-contacting measuring means, preferably includes absorbing the radiant energy introduced to the metal film thereby producing a temperature rise in the metal film. The absorbing step results in the metal film being at a higher temperature than the membrane. Further, the preferred method includes substantially transferring heat, due to the temperature difference between the metal film and the membrane, from the metal film to the membrane thereby causing the membrane to correspondingly expand and subsequently sag. Lastly, the preferred method includes measuring the subsequent sagging of the membrane with the non-contacting measuring (i.e., readout) means and generating an indication signal in response thereto. The indication signal is representative of the radiant energy detected by the detector. It is to be appreciated that the measuring step, utilizing the non-contacting measuring means, preferably includes the step of capacitively measuring the sagging of the membrane. Alternatively, such measuring step utilizing the non-contacting measuring means may preferably include the step of optically measuring the sagging of the membrane.

Previously, prior art radiant energy detectors seeking to achieve a high degree of sensitivity, and background limited performance, have required the use of costly cryogenic cooling systems due to the increased heat associated with detecting larger quantities of energy. As previously mentioned, such cooled detectors are not only expensive but also limited in the duration of time that they can operate which, in turn, disadvantageously affects the detection capability of the detector. Further, such prior art cooled detectors are known to suffer reliability problems when mechanical coolers are used.

Surprisingly, it has been discovered that a radiant energy detector formed in accordance with the present invention, and, thus, a focal plane array utilizing such novel detectors, may approach a detector sensitivity of approximately $1.27 \times 10^{10}$ cm-Hz$^{1/2}$/W. Further, when accounting for the transmission percentage of the transparent electrodes (i.e., approximately 80%) utilized in the differential capacitive readout approach to be discussed in detail later, the attainable D* is approximately $1.2 \times 10^{10}$ cm-Hz$^{1/2}$/W. It is to be understood, as described herein, that the present invention is capable of achieving such a high degree of sensitivity without the need for costly and operationally-limited cryogenic cooling as is necessary in prior art detectors. The present invention achieves both uncooled and background limited operation by the novel utilization of non-contacting readout means. The non-contacting readout means of the present invention, described in detail herein, such as the capacitive readouts (i.e., capacitance measuring circuits) and the optical readout (i.e., optical measuring device), permit a detector configuration which eliminates the use of contacting leads with respect to the detecting element. Accordingly, the elimination of such contact leads, associated with prior art radiant energy detectors, substantially eliminates the disadvantageous noise attributable to the thermal fluctuation associated with the thermal conductance of such contact leads. Thus, by implementing such a novel approach, the present invention overcomes the limitations of the prior art detectors.

These and other objects, features and advantages of the present invention will become apparent from the following detailed description of illustrative embodiments thereof which is to be read in connection with the accompanying drawings.

BRIEF DESCRIPTION OF THE DRAWINGS

FIG. 1 is a functional longitudinal cross sectional view of one form of a detecting element formed in accordance with the present invention.

FIG. 2 is a top plan view of one form of a thermally insulated substrate of a detecting element formed in accordance with the present invention.

FIG. 3 is a top plan view of one form of a membrane of a detecting element formed in accordance with the present invention.

FIG. 4 is a functional side view of an uncooled background limited detector (including a functional longitudinal cross sectional view of a detecting element), utilizing a non-contacting differential capacitive readout, formed in accordance with the present invention.

FIG. 14 is a schematic diagram illustrating one form of the frequency of oscillation measuring approach of the present invention.

FIG. 16 is a schematic diagram illustrating another form of the frequency of oscillation measuring approach of the present invention.

DETAILED DESCRIPTION OF THE PREFERRED EMBODIMENTS

Figure 5:
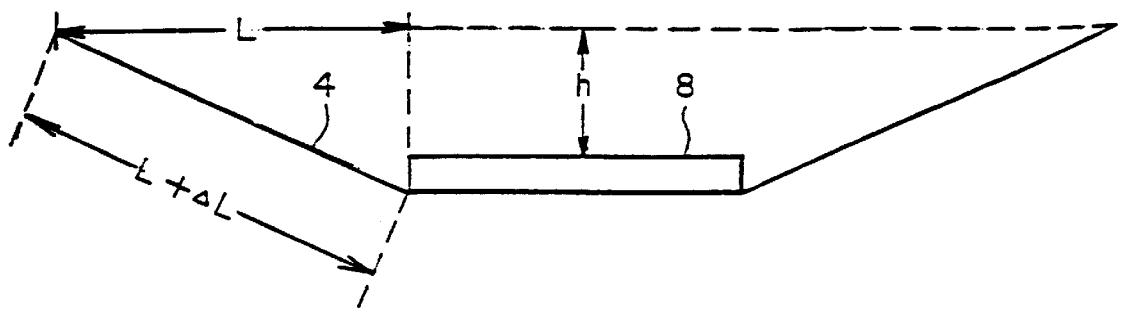
FIG. 5 is a functional side view illustrating the effect of membrane expansion of a detecting element formed in accordance with the present invention.

Referring initially to FIG. 1, a functional longitudinal cross sectional view of one form of a detecting element formed in accordance with the present invention is illustrated. The detecting element 1 is composed of a thermally insulated substrate 2, a membrane 4 and a metal film 8. It is to be appreciated that numerous methods of fabricating the detecting element 1 are embodied by the present invention; however, this detailed description will describe several of the preferred methods of fabrication.

In one method of fabrication, the thermally insulated substrate 2 is composed of low expansion ceramic quartz or Zerodor™ material in the form of plates. FIG. 2 is a top plan view of one form of the thermally insulated substrate 2 and illustrates the preferred shape of the substrate. As depicted in FIG. 2, the substrate is disc-shaped with a circular opening 3 passing through the center of the substrate. Further, the membrane 4 is composed of lead fluoride ($PbF_2$) and is approximately 1000 angstroms (Å) in thickness. Lead fluoride is chosen, as will be discussed in detail later, due to its high thermal expansion coefficient and low thermal conductivity. FIG. 3 is a top plan view of one form of the membrane 4 and illustrates the preferred shape of the membrane. As depicted in FIG. 3, the membrane is wheel-shaped having an outer circumferential area 5 and an inner hub area 6, with the outer circumferential area 5 and the inner hub area 6 attached by connecting spokes 7. Membrane cutouts 7A are openings defined between the outer circumferential area 5, the inner hub area 6 and each connecting spoke 7. One reason for forming the membrane in this manner, as will be described in greater detail later, is to control the thermal conductivity of the membrane which is a characteristic that is dependent on the cross sectional area of the material being used.

Again referring to FIG. 1, the membrane 4 is positioned on top of the thermally insulated substrate 2, with the inner hub area 6 (FIG. 3) of the membrane 4 centrally suspended over the circular opening 3 (FIG. 2) of the substrate 2. Next, the metal film 8 is deposited on top of the inner hub area 6 (FIG. 3) of the membrane 4. The metal film 8 is chosen to have a surface resistance of approximately 189 ohms/square. This metal film 8 having such a surface resistance, as will be described in greater detail later, is preferred due to its propensity to absorb incident infrared radiation with a high degree of efficiency. In fact, the metal film 8 having a surface resistance of approximately 189 ohms/square has an absorptivity (i.e., absorption efficiency) of approximately 50 percent, particularly for energy in the mid to far infrared spectral region (i.e., 5 μm to 12 μm).

An alternative approach to fabricating the detecting element 1 is to deposit a silicon dioxide ($SiO_2$), silicon nitride ($Si_3N_4$) or zinc sulfide (ZnS) film on the thermally insulated substrate. Similar to the lead fluoride membrane, each film preferably has a thickness of approximately 1000 Å. It is to be appreciated that the $SiO_2$, $Si_3N_4$ or ZnS film forms a similar membrane as described above. Further, an opening, similar to the circular opening 3 (FIG. 2), may be etched into the substrate allowing the membrane to be exposed and thereby be suspended over the opening. Lastly, the metal film is deposited on the $SiO_2$, $Si_3N_4$ or ZnS film in a manner similar to that previously mentioned.

In yet a further alternative embodiment, the membrane 4 is composed of a polymer, preferably a copolymer, and is approximately 200 Å in thickness. In this particular form, the membrane 4 need not have the same hub and spoke configuration described above; rather, the copolymer membrane may be fabricated without cutouts formed therein.

Referring now to FIG. 4, a functional side view of an uncooled background limited detector 100 (including a functional longitudinal cross sectional view of the detecting element 1), utilizing a non-contacting differential capacitive readout, formed in accordance with the present invention is illustrated. It is to be appreciated that the operation of the detecting element 1, fabricated by any of the several methods described above, will now be described. Also, it should be understood that the same reference designators are used in FIG. 4 as are used in previous figures to denote the same components.

Thus, the uncooled background limited detector 100 for detecting radiant energy is composed of the detecting element 1 (itself composed of the thermally insulated substrate 2, the membrane 4 and the metal film 8), a detector enclosure 10 having a detector enclosure window 12, detecting element mounting supports 40, a first dual electrode member 20, first dual electrode member mounting supports 46, a second dual electrode member 30, second dual electrode member mounting supports 52, and a differential bridge measurement circuit 18. The first dual electrode member 20, itself includes a first electrode 22, a second electrode 24, a substrate layer 26 and a coating layer 28. The electrodes 22 and 24 are adjacent but not contacting each other and are mounted on substrate layer 26. Coating layer 28 is mounted on the substrate layer 26, opposite the side upon which the electrodes are mounted. Similarly, the second dual electrode member 30, itself, includes a first electrode 32, a second electrode 34 and a substrate layer 36 upon which the electrodes are mounted. Electrodes 32 and 34 are adjacent to each other but do not contact one another.

The detecting element 1 is suspended inside the detector enclosure 10 by detecting element mounting supports 40. Each detecting element mounting support 40 has a first end 42 and an opposite second end 44, and is composed of a material having a low thermal conductivity. Each support 40 is connected to the detector enclosure 10 at the first end 42 and to the thermally insulated substrate 2 at the second end 44. Further, the detecting element 1 is positioned inside the detector enclosure 10 in order to maximize the exposure of the metal film 8 to radiant energy passing through the detector enclosure window 12. It is to be appreciated that, in a preferred embodiment of the present invention, such optimum positioning will result in a field stop angle of 60 degrees. The field stop angle is the angle formed in relation to the field of view of the detector, which is determined by the placement of the metal film 8 with respect to the detector enclosure window 12.

In a similar manner, the first dual electrode member 20 is suspended inside the detector enclosure 10 by first dual electrode member mounting supports 46. Specifically, each mounting support 46 has a first end 48 and an opposite second end 50. Further, each mounting support 46 is connected to the detector enclosure 10 at the first end 48 and to the substrate layer 26 at the second end 50. Similarly, the second dual electrode member 30 is also suspended inside the detector enclosure 10 by second dual electrode member mounting supports 52. Specifically, each mounting support 52 has a first end 54 and an opposite second end 56. Further, each mounting support 52 is connected to the detector enclosure 10 at the first end 54 and to the substrate layer 36 at the second end 56. It is to be appreciated that the first and second dual electrode members, 20 and 30, are positioned inside of the detector enclosure 10 in close non-contacting proximity to the metal film 8 of the detecting element 1. In a preferred embodiment, the electrode members are each positioned approximately 10 micrometers ($\mu$m) from the metal film 8.

Lastly, the differential bridge measurement circuit 18 is electrically coupled to the first and second dual electrode members, 20 and 30, in a manner that will now be described. Initially, it is to be understood that the differential bridge measurement circuit 18 includes a differential resistor R having first, second and third terminals, a sine wave signal generator G having first and second terminals, and a sensor S having first and second terminals. Accordingly, the first electrode 22 of the first dual electrode member 20, the first electrode 32 of the second dual electrode member 30 and the first terminal of the sensor S are all electrically connected to a ground potential. Next, the second electrode 24 of the first dual electrode member 20 is electrically connected to the first terminal of the differential resistor R and the first terminal of the sine wave signal generator G. On the other hand, the second electrode 34 of the second dual electrode member 30 is electrically connected to the second terminal of the differential resistor R and the second terminal of the sine wave signal generator G. In addition, the third terminal of the differential resistor R is connected to the second terminal of the sensor S. It is to be appreciated that, although the differential bridge measurement circuit 18 is shown external to the detector enclosure 10 in FIG. 2, such differential bridge measurement circuit 18 may be mounted inside the detector enclosure 10.

Given the above-described structural definition of the uncooled background limited detector 100, illustrated in FIG. 4, the operation of the detector 100 will now be described. Radiant energy, particularly in the mid to far infrared spectral region, passes through the detector enclosure window 12 of the detector enclosure 10. The detector enclosure 10 is vacuum sealed and temperature stabilized in order to eliminate the effect of convective heat. Next, the radiant energy passes through the detector enclosure window 12 and encounters the first dual electrode member 20. It is to be appreciated that the first electrode 22, the second electrode 24, the substrate layer 26 and the coating layer 28 of the first dual electrode member 20 are all substantially transparent to radiant energy having wavelengths in the mid to far infrared spectral region. Particularly, the infrared radiant energy transparency level associated with the first dual electrode member 20 of the preferred embodiment of the present invention permits approximately 80 percent of the radiant energy which passes through the detector enclosure window 12 to be transmitted through the first dual electrode member 20.

Next, the radiant energy which passes through the first dual electrode member 20 is incidentally introduced to the metal film 8 of the detecting element 1. The metal film 8, which has a surface resistance of approximately 189 ohms/square, substantially absorbs the radiant energy incidentally introduced. It is to be understood that a metal film, with a surface resistance of approximately 189 ohms/square, has an absorptivity (i.e., absorption efficiency) of approximately 50 percent. This means that the metal film 8 absorbs approximately 50 percent of the radiant energy incidentally introduced thereto, reflects approximately 25 percent of such radiant energy and transmits approximately 25 percent of such radiant energy. Such a metal in which absorbs 50 percent of incident radiant energy, is said to have an emissivity of 0.5.

Subsequently, due to the absorption of the radiant energy, the metal film 8 begins to experience a rise in temperature. Because the membrane 4 (and also the thermally insulated substrate 2) is at a lower temperature than the metal film 8, a transfer of heat takes place between the metal film 8 and the membrane 4. This heat, transferred from the metal film 8 to the membrane 4, causes the membrane 4 to experience a temperature increase and to correspondingly linearly expand. In turn, the linear expansion of the membrane 4 causes the inner hub area 6 of the membrane 4, which is suspended over the circular opening 3 in the thermally insulated substrate 2, to sag.

It is to be appreciated that one feature of the present invention is the shape and thermal characteristics of the material which is used to fabricate the membrane 4. Specifically, the composition of the membrane 4 is chosen to have a low thermal conductivity. Thermal conductivity is a substantially constant value (i.e., constant over a particular temperature range for a given material) representing the propensity of a material to conduct heat. Further, the composition of the membrane 4 is chosen to have a high thermal expansion coefficient. Thermal expansion is the amount of linear expansion associated with a unit temperature rise in a material. A material's degree of linear expansion due to an increase in temperature is a function of the material's thermal expansion coefficient. In addition, the composition and shape of the membrane 4 is chosen to have a low heat capacity. The heat capacity, C, of a material is defined as the ratio of the amount of heat energy supplied to a material to its corresponding temperature rise. The heat capacity per unit mass of a material is called the specific heat, c, of the material.

The membrane 4 has a low thermal conductivity in order that the heat transferred from the metal film 8 remains in the membrane 4 and does not escape to the thermally insulated substrate 2. It is to be understood that, while the substrate 2 is thermally insulated, a perfect thermal insulator does not exist and, thus, the membrane 4 is chosen to have a low thermal conductivity so as to minimize thermal current flow between the membrane 4 and the substrate 2. Further, the membrane 4 has a high thermal expansion coefficient in order that the membrane 4 will experience a relatively high rate of linear expansion based on an increase in the temperature of the membrane 4 resulting from the metal film 8 absorbing more radiant energy and subsequently transferring heat to the membrane 4. Still further, the material composing the membrane 4 is chosen to have a low heat capacity. One reason for choosing a material with a low heat capacity is to control the time it takes the membrane 4 to reach thermal equilibrium with the metal film 8 and the thermally insulated substrate 2.

Thermal equilibrium is the condition that occurs when contacting bodies, initially at different temperatures, substantially reach (i.e., asymptotically approach) a steady-state temperature. It is advantageous for the detecting element 1 to reach thermal equilibrium as quickly as possible in order to maximize the detecting time response of the detector. In other words, the quicker the membrane 4 of the detecting element 1 can heat up, expand, sag and subsequently cool down and contract, the better the detecting element 1 will be able to detect radiant energy occurring at closer time intervals.

Accordingly, the thermal equilibrium time constant, $\tau$, associated with a system is a function of the thermal conductivity of the conducting materials involved. Thus, for the present invention, the thermal equilibrium time constant of the system can be defined as:

$$\tau = C/G$$

where C is the heat capacity of the membrane 4 and G is the thermal conductance of the membrane 4. The thermal conductance is a figure of merit associated with the thermal coupling of the thermally conducting material (i.e., membrane 4) to another body. The thermal conductance is proportional to the thermal conductivity of a material whose response to thermal activity is of interest. In the case of the present invention, the response of the membrane 4 to thermal activity is of interest.

Intuitively, it would seem desirable to design for a high thermal conductance, G, thereby keeping the thermal equilibrium time constant, $\tau$, relatively short. However, a high thermal conductance yields a low thermal resistivity thereby making the material a good conductor of thermal current. This is contrary to what is desired of the membrane 4 of the present invention. As previously mentioned, the membrane 4 is chosen to have a low thermal conductivity such as to minimize the thermal current flow to the substrate 2. Therefore, to compensate for the low thermal conductivity associated with the membrane 4 which would otherwise cause the thermal equilibrium time constant, $\tau$, to be relatively long, the thermal capacity, C, of the membrane 4 is chosen to be low. In this manner, the thermal equilibrium time constant, $\tau$, is kept low thereby yielding a detector with improved detecting resolution. Because the heat capacity of a material is related to the thermal mass of the material, the heat capacity of the membrane 4 is designed to be relatively low by minimizing the size of the membrane. Accordingly, this result is accomplished by the advantageous design shape of the membrane 4 as illustrated in FIG. 3. Also, the same result is accomplished with the copolymer membrane embodiment because of its decreased thickness (i.e., approximately 200 Å), as compared to the other embodiments discussed herein. It is to be appreciated that, in a preferred embodiment of the present invention, thermal equilibrium is reached in approximately $3.0 \times 10^{-3}$ seconds.

As previously mentioned, in a preferred embodiment, the membrane is composed of lead fluoride. Lead fluoride is chosen because it exhibits an optimum ratio of thermal expansion (e.g., high) to thermal conductivity (e.g., low). In other words, while lead fluoride does not possess the highest thermal expansion coefficient of all known materials, nor exhibit the lowest thermal conductivity of all known materials, lead fluoride does exhibit the largest ratio of thermal expansion to thermal conductivity. Accordingly, this optimum ratio, in addition to the associated heat capacity of the material, is preferred, as it allows the detecting element 1 of the present invention to more closely achieve some or all of the advantageous features described herein. It is to be appreciated that, while lead fluoride may be used in a preferred embodiment, the membrane 4 may also be composed of the other materials previously described and still provide the advantages associated with the present invention.

Referring now to FIG. 5, a functional side view illustrating the effect of membrane expansion of a detecting element formed in accordance with the present invention is illustrated. Prior to the metal film 8 absorbing radiant energy, a portion of the membrane 4 is initially at some length L. Upon the metal film 8 absorbing radiant energy and subsequently transferring heat to the cooler membrane 4, the portion of the membrane 4, in accordance with the membrane's thermal expansion coefficient, will linearly expand to some length L+ΔL. In response to this linear expansion, the membrane 4 will sag. Accordingly, the metal film 8 will change from its initial vertical position by some vertical distance h.

As an example, assume that the initial length, L, of a portion of the membrane 4 is 0.1 cm. Further, assume that a lengthwise linear expansion, ΔL, of $10^{-8}$ cm occurs to this portion of the membrane 4 in response to the heat transfer from the metal film 8. Solving for h, by using the Pythagorean theorem, yields a change in vertical distance of $0.45 \times 10^{-4}$ cm. Thus, advantageously, for a linear expansion of 1 Å (i.e., $10^{-8}$ cm), the membrane 4 and, thus, the metal film 8, sags by approximately $0.45 \times 10^{-4}$ cm. It is to be appreciated that such a response is more than a four thousand fold change in vertical position given a particular horizontal (i.e., lengthwise) expansion. Thus, advantageously, such a change in vertical position of the metal film 8 is detectable by the non-contacting detector readout means of the present invention. The detector readout means, formed in accordance with the present invention, will now be described.

Referring again to FIG. 4, a detector formed in accordance with the present invention, utilizing a non-contacting differential capacitive readout, is illustrated. Particularly, as previously mentioned, the differential capacitive readout is in non-contacting proximity to the metal film 8 of the detecting element 1. Accordingly, the metal film 8 and the four electrodes of the first and second dual electrode members, 20 and 30, respectively form opposing plates of first, second, third and fourth capacitors. Specifically, the metal film 8 and electrode 32 form opposing plates of the first capacitor, the metal film 8 and electrode 34 form opposing plates of the second capacitor, the metal film 8 and electrode 22 form opposing plates of the third capacitor and the metal film 8 and electrode 24 form opposing plates of the fourth capacitor. Further, the resultant first, second, third and fourth capacitors are respectively electrically coupled to the differential bridge measurement circuit 18 in the manner previously described. It is to be understood that the above-described components, acting as the non-contacting differential capacitive readout, form a differential capacitance measuring circuit.

Figure 6:
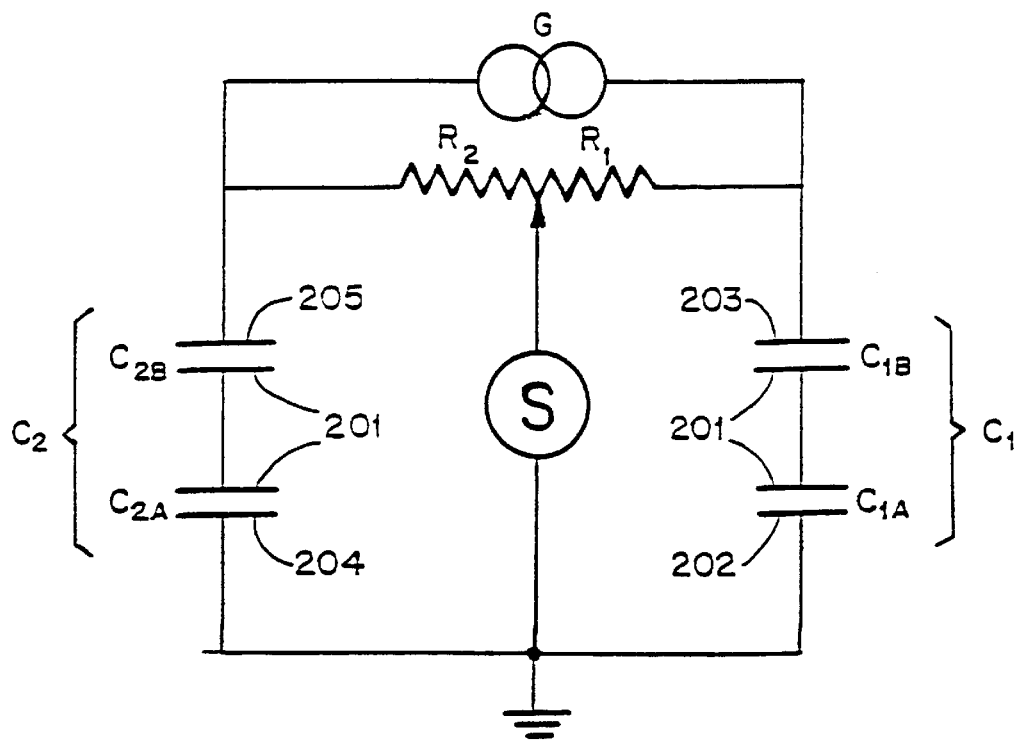
FIG. 6 is a schematic diagram illustrating the differential capacitance measuring circuit of the present invention.

Referring now to FIG. 6, a schematic diagram illustrating the differential capacitance measuring circuit formed by the metal film 8, the four electrodes 22, 24, 32 and 34 and the differential bridge measurement circuit 18 of the present invention is illustrated. It is to be appreciated that the metal film 8 functions as a capacitive plate 201 which, as is evident in FIGS. 4 and 6, functions as a common capacitive plate in order to respectively form the previously-mentioned four capacitors in conjunction with the four electrodes. Thus, electrode 32 functions as capacitive plate 202 and, with capacitive plate 201, forms the first capacitor, $C_{1A}$, having a first capacitance associated therewith. Further, electrode 34 functions as capacitive plate 203 and, with capacitive plate 201, forms the second capacitor, $C_{1B}$, having a second capacitance associated therewith. Still further, electrode 22 functions as capacitive plate 204 and, with capacitive plate 201, forms the third capacitor, $C_{2A}$, having a third capacitance associated therewith. Lastly, electrode 24 functions as capacitive plate 205 and, with capacitive plate 201, forms the fourth capacitor, $C_{2B}$, having a fourth capacitance associated therewith.

The equivalent differential capacitance measuring circuit, depicted in FIG. 6, is shown in order to illustrate one of the features of the present invention, that is, the fact that the metal film 8 and, thus, the entire detecting element 1, does not physically contact the detector readout means of the present invention. As mentioned previously, the inability of the prior art radiant energy detectors to operate at a higher level of detector sensitivity, D*, was due to the fact that thermal fluctuation associated with the thermal conductance of the contact leads between the prior art detecting element and the prior art readout means served as a source of system noise which, in turn, degraded the performance of these prior art detectors. Accordingly, the fact that the detecting element 1 and the detector readout means of the present invention do not come into physical contact with one another allows the present invention to advantageously provide the much desired uncooled background limited operation previously discussed.

Specifically, the differential capacitance measuring circuit functions in the following manner. Capacitors $C_{1A}$ and $C_{1B}$ are connected in series and, thus, have an equivalent total capacitance associated therewith. The equivalent capacitance will be hereinafter denoted as equivalent capacitor $C_1$. Likewise, capacitors $C_{2A}$ and $C_{2B}$ are connected in series and, thus, also have an equivalent total capacitance associated therewith. Similarly, such equivalent capacitance will be hereinafter denoted as equivalent capacitor $C_2$.

It is to be appreciated that the differential resistor R of differential bridge measurement circuit 18, having first, second and third terminals, may be a potentiometer in a preferred embodiment of the present invention. In such a case, the third terminal functions as the center tap (or wiper) of the potentiometer, thus, providing respective variable resistances between the first terminal and the center tap, denoted hereinafter as resistor $R_1$, and between the second terminal and the center tap, denoted hereinafter as resistor $R_2$. Still further, in an alternative embodiment of the present invention, the differential resistor R may actually be two individual series-connected resistors, R1 and R2, whereby the second terminal of the sensor S is connected between the junction of the resistors R1 and R2. In order to adjust the values of these individual resistors and, thus, balance the circuit (as will be discussed in detail below), the resistors may be laser trimmed in order to set their values.

Accordingly, a differential capacitance measuring circuit, referred to hereinafter as the measuring circuit, is formed by the capacitors $C_1$ and $C_2$ and the components of the bridge measurement circuit 18. The measuring circuit is essentially composed of four legs, each leg consisting of one of the equivalent components $C_1$, $C_2$, $R_1$ and $R_2$. In operation, the sine wave signal generator G is floating, i.e., not directly referenced to ground but rather connected across the junction of the measuring circuit where equivalent components $R_1$ and $C_1$ join and the junction of the measuring circuit where equivalent components $R_2$ and $C_2$ join. In an alternative embodiment, the generator G may be referenced to ground but still be made to effectively "float" by coupling an AC isolation transformer between the terminals of the generator G and the above-described junctions of the measuring circuit components. Nonetheless, the generator G provides a sinusoidal reference signal across the measuring circuit such that respective voltages are produced across each of the equivalent components, $C_1$, $C_2$, $R_1$ and $R_2$. It is to be appreciated that when the circuit is balanced, an indication of zero volts is sensed and provided by the sensor S. The reason for such an indication at the sensor S will now be explained. Specifically, the measuring circuit is balanced when the values associated with one pair of diagonal legs of the circuit match the values associated with the other pair of diagonal legs of the circuit and, thus, the corresponding voltages in each pair of diagonal legs are equal and opposite. In this particular case, balancing occurs when:

$$R_1 \times C_2 = R_2 \times C_1$$

Another way of mathematically realizing this concept is to understand that, in essence, a ratio of the values associated with two adjacent legs is being compared to a ratio of the values associated with the other two adjacent legs. Thus, again with respect to this particular case, when:

$$R_1/R_2 = C_1/C_2$$

then the measuring circuit is considered balanced.

Also, it is to be appreciated that because only the ratio of the legs are of concern in balancing the circuit, a balanced circuit can be formed by replacing resistors $R_1$ and $R_2$ (i.e., potentiometer R) with inductors $L_1$ and $L_2$ or with capacitors $C_3$ and $C_4$. Accordingly, instead of the potentiometer R (or the laser-trimmed resistors R1 and R2) providing the initial balancing control, precision adjustable capacitors or inductors may be utilized.

Thus, it is to be appreciated that the measuring circuit formed by the uncooled background limited detector 100 is initially balanced (i.e., the ratio of the voltages associated with $R_1$ and $R_2$ is equal to the ratio of the voltages associated with $C_1$ and $C_2$). Such is the case when the detector is not detecting radiant energy. In other words, the capacitors $C_{1A}$, $C_{1B}$, $C_{2A}$ and $C_{2B}$ and, thus, the equivalent capacitors $C_1$ and $C_2$, exhibit an initial capacitance when the detector is not detecting radiant energy. Accordingly, the potentiometer R (or individual laser-trimmed series-connected resistors $R_1$ and $R_2$) is adjusted so that the ratio of the voltages respectively present between its first terminal and its center tap and between its second terminal and its center tap, equal the ratio of the voltages present across $C_1$ and $C_2$. Specifically, in the preferred embodiment, the potentiometer R is adjusted in order that a value of zero volts is indicated by sensor S.

Subsequently, as the metal film 8 of the detecting element 1 absorbs radiant energy causing the membrane 4 to linearly expand and, thus, the metal film 8, to experience a vertical displacement, the distance between the metal film 8 and the four electrodes 22, 24, 32 and 34 will change. This change in distance will result in the capacitive values associated with $C_{1A}$, $C_{1B}$, $C_{2A}$ and $C_{2B}$ changing. Therefore, the value of the equivalent capacitors $C_1$ (i.e., $C_{1A}$ in series with $C_{1B}$) and $C_2$ (i.e., $C_{2A}$ in series with $C_{2B}$) will change. Particularly, because the distance between the metal film 8 and electrodes 32 and 34 decreases upon the sagging of membrane 4, the value of $C_1$ proportionately increases. On the other hand, because the distance between the metal film 8 and electrodes 22 and 24 increases upon the sagging of membrane 4, the value of $C_2$ proportionately decreases. Thus, the resulting changes in capacitance exhibited by $C_1$ and $C_2$ cause the measuring circuit to become unbalanced. That is, an increase in the capacitance associated with $C_1$ will result in a decrease in the voltage across $C_1$, while, conversely, a decrease in the capacitance associated with $C_2$ will result in an increase in the voltage across $C_2$. Thus, the ratio of $C_1$ to $C_2$ will increase thereby unbalancing the circuit. Hence, a voltage will be detected by the sensor S at its second terminal. Significantly, the voltage detected by the sensor S will be representative of the radiant energy detected by the detecting element 1 of the uncooled background limited detector 100, thus giving the user (or system) an indication of the amount and/or type of radiant energy detected by the present invention.

An advantageous increase in detection sensitivity is provided by the non-contacting differential capacitance readout of the present invention just described. Such advantage is due to the fact that, because $C_1$ and $C_2$ experience substantially equal capacitance changes in opposite directions (i.e., $C_1$ increases as $C_2$ decreases), a larger overall capacitance change is experienced. Thus, such a "magnification" of the capacitance change experienced by the detector 100 allows the sensor S of the bridge measurement circuit 18 to sense an appreciable voltage for very small quantities of detected radiant energy.

Further, it is to be appreciated that electrodes 22 and 24, which are part of the first dual electrode member 20, and electrodes 32 and 34, which are part of the second dual electrode member 30, are typically respectively placed approximately 10 micrometers ($\mu$m) from the metal film. However, in a preferred embodiment of the detector 100, electrodes 32 and 34 are placed slightly closer to the metal film 8 than electrodes 22 and 24, thereby providing a constant electrostatic attraction between the metal film 8 and electrodes 32 and 34. In this manner, the metal film 8, upon thermal expansion of membrane 4, will always deflect toward electrodes 32 and 34 regardless of the effects of gravity in relation to the detector's physical orientation. Still further, it is to be appreciated that a DC bias may be applied to the differential capacitance measuring circuit of the present invention in order to establish a permanent polarity.

Yet another advantage which is realized by the non-contacting differential capacitive readout approach described above is that the voltage fields associated with $C_{1B}$ and $C_{2B}$ are advantageously orthogonal to the metal film 8 and, therefore, will not contribute any significant thermal energy to the metal film 8. In this manner, not only is conductive thermal noise substantially eliminated due to the non-contacting nature of the differential capacitive readout means of the present invention, but also, any radiated thermal noise produced by the differential capacitive readout means is substantially minimized as well.

It is to be further understood that, while the differential bridge measurement circuit 18 described above is employed in a preferred embodiment, conventional bridge measurement circuits may be employed in place of the differential bridge measurement circuit 18 in order to detect and provide an indication of the capacitance changes in capacitors $C_{1A}$, $C_{1B}$, $C_{2A}$ and $C_{2B}$.

Figure 7:
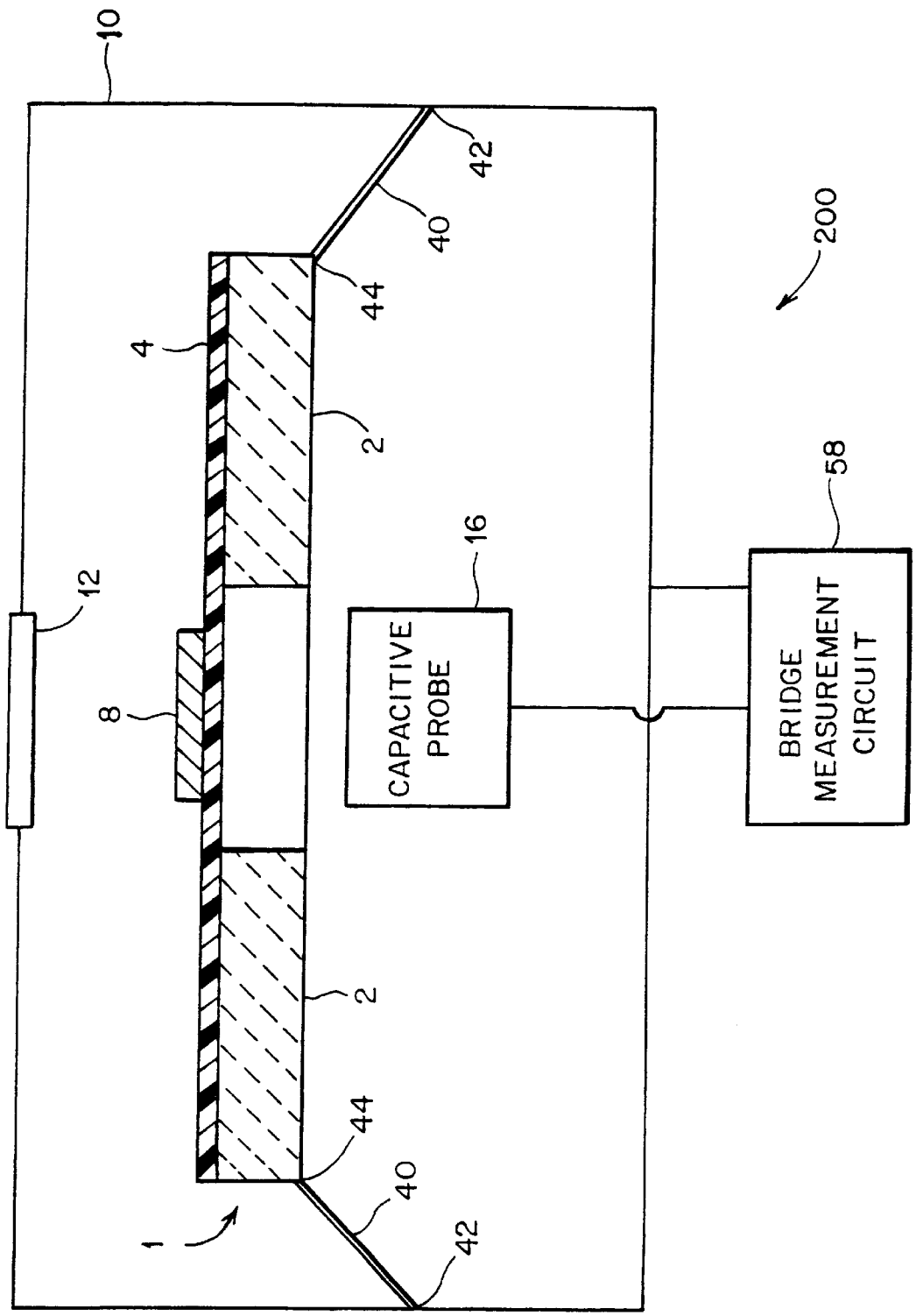
FIG. 7 is a functional side view of an uncooled background limited detector (including a functional longitudinal cross sectional view of a detecting element), utilizing another form of a non-contacting capacitive readout, formed in accordance with the present invention.

Referring now to FIG. 7, a detector formed in accordance with the present invention, utilizing an alternative non-contacting capacitive readout, is illustrated. It should be understood that the same reference designators are used in FIG. 7 as are used in previous figures to denote the same components. Thus, the uncooled background limited detector 200 for detecting radiant energy is composed of the detecting element 1 (itself composed of the thermally insulated substrate 2, the membrane 4 and the metal film 8), the detector enclosure 10 having the detector enclosure window 12, detecting element mounting supports 40, a capacitive probe 16 and a bridge measurement circuit 58. The detecting element 1 is suspended in the detector enclosure 10 by mounting supports 40 in the same manner as previously discussed with respect to detector 100. Also, the detecting element 1 is positioned inside the enclosure 10, with respect to the window 12, in order to maximize the exposure of the metal film 8 to radiant energy passing through the window 12. Similar to detector 100, the detecting element 1 of detector 200 is preferably positioned in order to create a field stop angle of approximately 60 degrees.

The capacitive probe 16, also mounted inside the detector enclosure 10, is positioned in close non-contacting proximity to the metal film 8 of the detecting element 1. Further, the bridge measurement circuit 58 is electrically coupled to the capacitive probe 16 and the detector enclosure 10. While the bridge measurement circuit 58 is illustrated external to the detector enclosure 10 in FIG. 7, such circuit may be mounted inside the enclosure 10 in an alternative embodiment.

The detecting element 1 of detector 200 is responsive to radiant energy passing through the detector enclosure window 12 in the exact same manner as previously described; however, in the case of detector 200 as opposed to detector 100, the radiant energy is imposed directly on the metal film 8. Nonetheless, the membrane 4 experiences a similar thermal expansion and subsequent sagging due to the absorption of radiant energy by the metal film 8.

The non-contacting capacitive readout of detector 200 is formed in the following manner. The metal film 8 and the capacitive probe 16 respectively form opposing plates of one capacitor. Additionally, the metal film 8 and the detector enclosure 10, which is composed of a metal, respectively form opposing plates of another capacitor. Further, the capacitive probe 16 and the detector enclosure 10 are respectively electrically coupled to the bridge measurement circuit 58, thus forming a capacitance measuring circuit.

Figure 8:
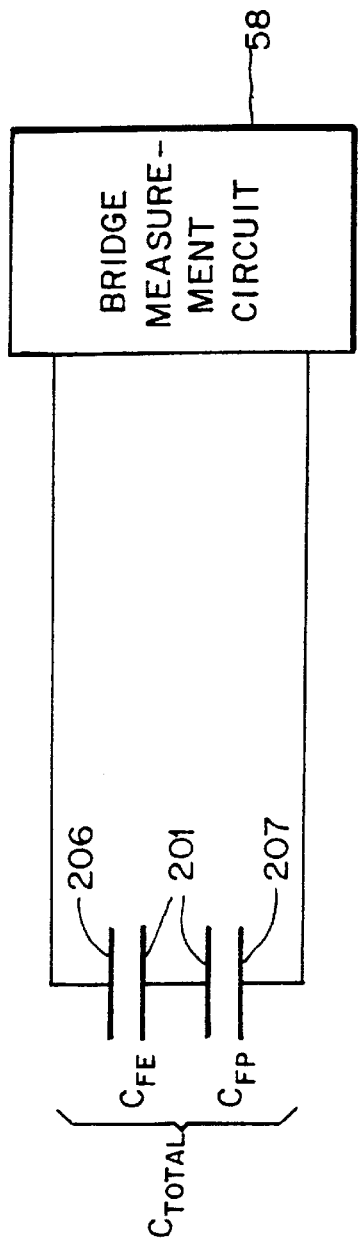
FIG. 8 is a schematic diagram illustrating another form of the capacitance measuring circuit of the present invention.

Referring now to FIG. 8, a schematic diagram of the capacitance measuring circuit formed by the metal film 8, the detector enclosure 10, the capacitive probe 16 and the bridge measurement circuit 58 of the present invention is illustrated. It is to be appreciated that metal film 8, similar to its circuit function in detector 100, functions as capacitive plate 201, while the detector enclosure 10 functions as capacitive plate 206. Accordingly, capacitive plates 201 and 206 form the first capacitor $C_{FE}$. The first capacitor $C_{FE}$ represents the stray capacitance between the metal film 8 and the enclosure 10. Similarly, capacitive probe 16 functions as capacitive plate 207, and in combination with capacitive plate 201 (i.e., metal film 8), forms the second capacitor $C_{FP}$. The second capacitor $C_{FP}$ represents the capacitance between the metal film 8 and the capacitive probe 16.

It can be seen that the capacitive plate 206 (i.e., enclosure 10) and the capacitive plate 207 (i.e., capacitive probe 16) are electrically coupled to the bridge measurement circuit 58. Since this approach is essentially a non-differential approach, it is to be appreciated that the bridge measurement circuit 58 may be any type of bridge measurement circuit known to persons skilled in this art. For instance, the bridge measurement circuit 58, in combination with capacitance $C_{TOTAL}$ (i.e., capacitive series-connected equivalent of $C_{FE}$ and $C_{FP}$), may form a Wien bridge circuit. As with most existing bridge circuits, an unknown component value in the circuit may be determined by calculation or measurement if the values of the other circuit components are known. Thus, in the circuit shown in FIG. 8, $C_{TOTAL}$ serves as the unknown value to be calculated or measured, while the other components (not shown) in the bridge measurement circuit 58 are known.

Accordingly, as the metal film 8 of the detecting element 1 absorbs radiant energy causing the membrane 4 to experience a linear expansion and, thus, the metal film 8, to experience a vertical displacement, the distance between the metal film 8 and the capacitive probe 16 will change. This change in distance will result in the value of $C_{FP}$ changing. Likewise, as the metal film 8 experiences a positional displacement with respect to the detector enclosure 10, the value of $C_{FE}$ will also change. Therefore, the value of $C_{TOTAL}$ is determined by using the bridge measurement circuit 58. As an example, it is to be appreciated that for a metal film having an area of 1 mm², a lengthwise linear expansion of 1 Å in a 0.5 mm long portion of a membrane will result in a change of capacitance (i.e., in $C_{TOTAL}$) of 0.45 pf. Such a change in capacitance is detectable by the capacitance measuring circuit of the present invention, illustrated in FIG. 7. In turn, the capacitive value change measured by the present invention is correlated to a particular quantity and/or particular type of radiant energy, thus giving the user of (or system using) the present invention valuable information concerning the quantity and/or type of radiant energy detected.

Figure 15:
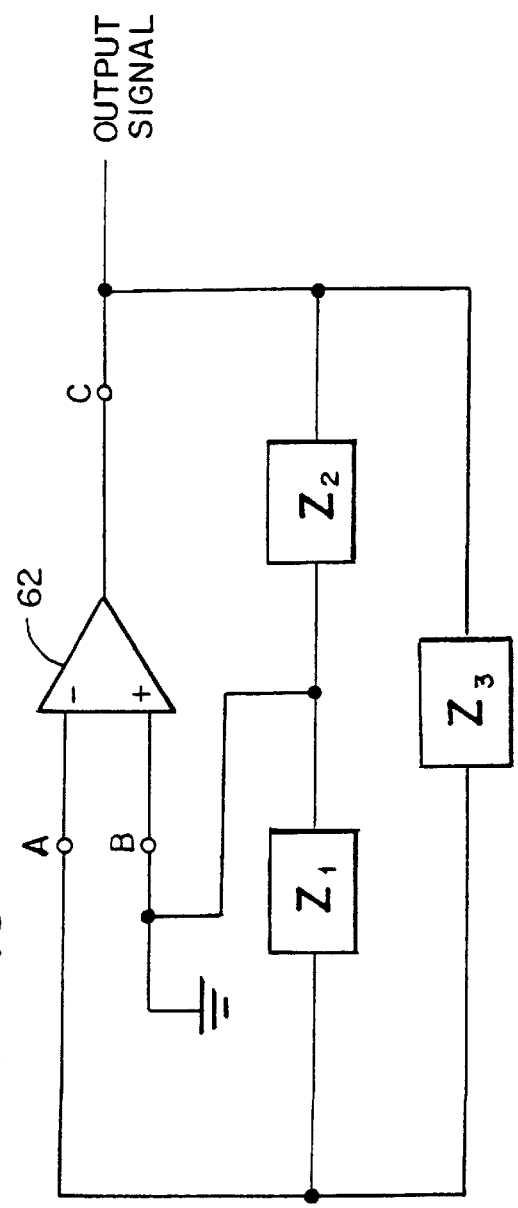
FIG. 15 is a schematic diagram illustrating a general form of a generic resonant-circuit oscillator.

It is to be appreciated that the present invention contemplates yet another alternative embodiment employing the non-contacting capacitive readout approach. As mentioned previously, the measuring means of the present invention may include an arrangement whereby the equivalent capacitors formed as part of the capacitance measuring circuits described above (i.e., $C_{1A}$, $C_{1B}$, $C_{2A}$, $C_{2B}$, $C_{FE}$ and $C_{FP}$) may form a part of a resonating circuit of an oscillator. Referring now to FIG. 14, a schematic diagram of a circuit formed in accordance with the present invention whereby an oscillator is employed for measuring the change in capacitance associated with the equivalent capacitors formed in a manner as described above, is illustrated. Particularly, equivalent capacitors $C_{FE}$ and $C_{FP}$ are shown, in FIG. 14, connected to oscillator circuit 60. Specifically, capacitive plate 206 is electrically coupled to a first terminal of oscillator circuit 60, while capacitive plate 207 is similarly coupled to a second terminal of circuit 60. It is to be understood that oscillator circuit 60 along with equivalent capacitors $C_{FE}$ and $C_{FP}$ may form any of several oscillators known to one skilled in the art, i.e., a phase shift oscillator, a Colpitts oscillator, a Hartley oscillator, etc. A general form of a generic resonant-circuit oscillator is illustrated in FIG. 15 whereby device 62, while illustrated as an operational amplifier, may also be a bipolar junction transistor or a field effect transistor, and the combination of $C_{FE}$ and $C_{FP}$ may represent one of the reactances, $Z_1$, $Z_2$ and $Z_3$, which determine the frequency of the signal which is present on terminal C of device 62. Terminal C of device 62 is actually the third terminal of oscillator circuit 60, shown in FIG. 14 and denoted by the label "output signal." Accordingly, by $C_{FE}$ and $C_{FP}$ changing capacitance, in the novel manner previously described, the frequency of the signal present on terminal C of device 62 will correspondingly change. In this manner, the frequency of oscillation of the signal outputted from the oscillator circuit 60 (i.e., terminal C of device 62) is directly indicative of the amount and/or type of radiant energy detected by the detector of the present invention.

Also, a signal generated by a reference oscillator (not shown) may be compared to the signal present on terminal C such that the rate of phase change between the signals is indicative of the radiant energy detected by the detector. It should be understood that the generic oscillator shown in FIG. 15 is illustrated for exemplary purposes only and one skilled in the art would be able to implement the novel frequency measurement approach with more simpler or more complex oscillators.

In another form of the non-contacting capacitive readout utilizing the frequency of oscillation of an oscillator as an indication of the capacitance change, FIG. 16 illustrates a schematic diagram of an alternate measuring means utilizing the equivalent capacitors, $C_{1A}$, $C_{1B}$, $C_{2A}$ and $C_{2B}$, formed in the differential capacitive readout approach described above. Specifically, capacitors $C_{1A}$ and $C_{1B}$ are connected across oscillator circuit 64 in a similar manner as described with respect to oscillator circuit 60 of FIG. 14, while capacitors $C_{2A}$ and $C_{2B}$ are connected across oscillator circuit 66 in the same exact manner. Specifically, capacitive plates 202 and 203 are respectively electrically coupled to first and second terminals of oscillator circuit 64, while capacitive plates 204 and 205 are respectively electrically coupled to first and second terminals of oscillator circuit 66. It is to be understood that oscillator circuit 64 in combination with capacitors $C_{1A}$ and $C_{1B}$ and oscillator circuit 66 in combination with capacitors $C_{2A}$ and $C_{2B}$ may each form a resonant-circuit oscillator similar to that shown in FIG. 15. Thus, the capacitance associated with capacitors $C_{1A}$ and $C_{1B}$ directly determines the frequency of oscillation of a signal outputted from a third terminal of oscillator circuit 64, while the capacitance associated with capacitors $C_{2A}$ and $C_{2B}$ directly determines the frequency of oscillation of a signal outputted from a third terminal of oscillator circuit 66. In such an approach, the frequencies of the two signals may be compared as a means of measuring each capacitance and the differential capacitance associated with this arrangement. Accordingly, the third terminals of oscillator circuits 64 and 66 are respectively electrically coupled to first and second terminals of a comparator 68. A third terminal of comparator 68 provides an output signal yielding the indication of the compared capacitance changes.

Also, the rate of change of phase between the two oscillators or between each oscillator and a third reference oscillator may be used as a method of measuring the associated frequency differences and, thus, the capacitance changes. Nonetheless, comparator 68, whether comparing frequency or phase, generates a signal which is directly indicative of the amount and/or type of radiant energy detected by the detector of the present invention. It should be understood that various other combinations of the equivalent capacitors, $C_{1A}$, $C_{1B}$, $C_{2A}$ and $C_{2B}$, may be employed to form oscillators capable of yielding the desired indication. This may include, but not be limited to, all four capacitors forming one oscillator circuit, or lesser numbers of the capacitors forming such a circuit.

Figure 9:
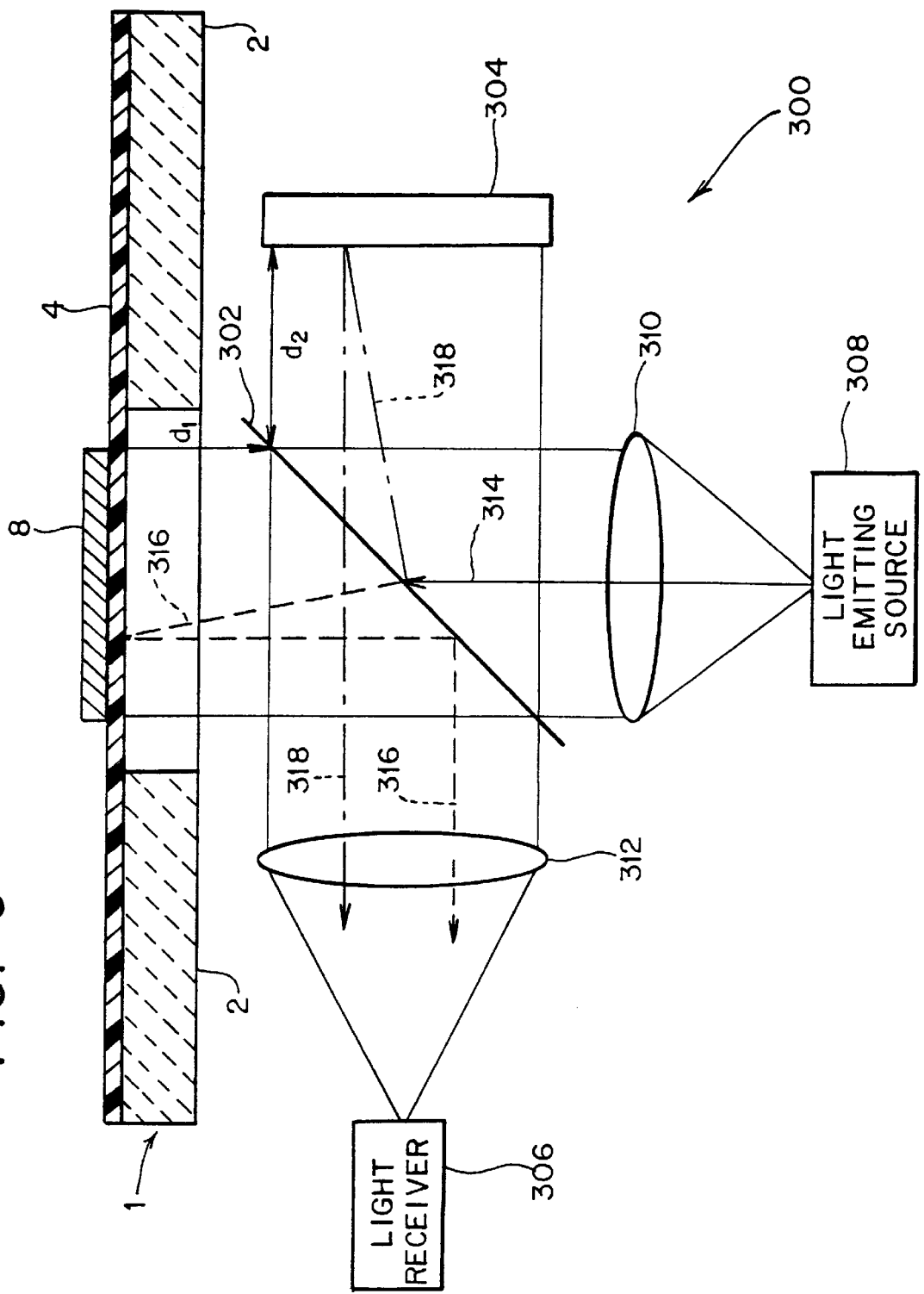
FIG. 9 is a functional side view of an uncooled background limited detector (including a functional longitudinal cross sectional view of a detecting element), utilizing a non-contacting optical readout, formed in accordance with the present invention.

Referring now to FIG. 9, a functional side view of an uncooled background limited detector 300 (including a functional longitudinal cross sectional view of a detecting element), utilizing a non-contacting optical readout, formed in accordance with the present invention is illustrated. It is to be appreciated that the non-contacting optical readout in the form of an optical measuring device, to be described below, provides similar advantages as were previously described with regard to the non-contacting capacitive readouts of the present invention. Additionally, it is to be understood that the detecting element 1, illustrated in FIG. 9 in the context of the uncooled background limited detector 300, is fabricated and functions in exactly the same manner as previously described with respect to the uncooled background limited detectors, 100 and 200, illustrated in FIGS. 4 and 7. Also, the same reference designators are used in FIG. 9 as are used in previous figures to denote the same components.

Accordingly, the non-contacting optical readout is composed of a beam splitter 302, a mirror 304, a light receiver 306, a light emitting source 308, a first lens 310, a second lens 312, and the metal film 8 of the detecting element 1. The beam splitter 302 is positioned at a distance $d_1$ from the metal film 8, while the mirror 304 is positioned at a distance $d_2$ from the beam splitter 302 and perpendicular in relation to the metal film 8. Further, the light receiver 306, which preferably is a silicon detector, is positioned opposite to the mirror 304 with the beam splitter 302 positioned therebetween. The light emitting source 308, which preferably is a monochromatic source such as a light emitting diode (LED) whose light is not absorbed by the metal film 8, is positioned opposite to the metal film 8 with the beam splitter 302 positioned therebetween. It is to be appreciated that if an LED operating in the visible wavelength region is utilized as the light emitting source 308, then a human eye may function as the light receiver 306. Still further, the first lens 310, included for focusing purposes, is positioned between the light emitting source 308 and the beam splitter 302, while the second lens 312, also included for focusing purposes, is positioned between the light receiver 306 and the beam splitter 302.

It should also be understood that the detecting element 1, illustrated in FIG. 9, is suspended in a detector enclosure (not shown), similar to the detector enclosure 10 having the detector enclosure window 12 of FIGS. 4 and 7. However, it is to be appreciated that the detector enclosure of the detector illustrated in FIG. 9 may also have means for allowing a transmitted beam portion 316, discussed below, to pass therethrough. Such means may preferably include a second detector enclosure window (not shown). Alternatively, the entire non-contacting optical readout may be mounted inside the detector enclosure, along with the detecting element 1, thereby eliminating the need for the second detector enclosure window.

Given the above-described structural definition of the uncooled background limited detector 300, illustrated in FIG. 9, the operation of the detecting element 1 and the non-contacting optical readout of the present invention will now be described. The light emitting source 308 emits a light beam 314 toward the beam splitter 302. In turn, the light beam 314 passes through the first lens 310 and, subsequently, strikes the beam splitter 302. The beam splitter 302 splits the light beam 314, emitted by the light emitting source 308, into a transmitted beam portion 316 and a reflected beam portion 318. It is to be appreciated that the transmitted beam portion 316 is the portion of the light beam 314 which passes through the beam splitter 302, while the reflected beam portion 318 is the portion of the light beam 314 which is reflected by the beam splitter 302.

Next, the transmitted beam portion 316, passing through the beam splitter 302, strikes the metal film 8 and, in turn, reflects back toward the beam splitter 302, whereby the beam splitter 302 substantially reflects the transmitted beam portion 316 toward the second lens 312. It is to be appreciated that a portion of the transmitted beam portion 316, which strikes the beam splitter 302 on its return trip, is also transmitted through the beam splitter 302; however, this portion does not significantly affect the functioning of the present invention. Further, the reflected beam portion 318, reflected by the beam splitter 302, strikes the mirror 304 and, in turn, reflects back toward the beam splitter 302, whereby the beam splitter 302 substantially transmits the reflected beam portion 318 toward the second lens 312. Again, it is to be appreciated that a portion of the reflected beam portion 318, which strikes the beam splitter 302 on its return trip, is also reflected by the beam splitter 302; however, this portion does not significantly affect the functioning of the present invention.

Accordingly, the transmitted beam portion 316 and the reflected beam portion 318 pass through the second lens 312 and are received at the light receiver 306. At the light receiver 306, the transmitted beam portion 316 and the reflected beam portion 318 exhibit an interference pattern. It is to be understood that the interference pattern depends on the difference between the distance $d_1$ (i.e., distance between the metal film 8 and the beam splitter 302) and the distance $d_2$ (i.e., distance between the mirror 304 and the beam splitter 302). Depending on this difference, the transmitted beam portion 316 and the reflected beam portion 318 will interfere constructively or destructively thereby varying the optical intensity observed by the light receiver 306. Accordingly, as the metal film 8 of the detecting element 1 absorbs radiant energy causing the membrane 4, and, thus, the metal film 8, to experience a vertical displacement, the distance $d_1$ between the metal film 8 and the beam splitter 302 will change. Therefore, the difference between the distance $d_1$ and the distance $d_2$ will change, resulting in a change in the optical intensity observed by the light receiver 306. This change in optical intensity is referred to as a fringe shift.

Referring again to a previously discussed example, it is to be appreciated that for a metal film 8 having an area of 1 mm$^2$, a lengthwise linear expansion of 1 Å in a 0.5 mm long portion of a membrane 4 will result in a vertical displacement of $0.316 \times 10^{-4}$ cm. Such a change in vertical displacement of the metal film 8, and, thus, a change in the difference between the distance $d_1$ and the distance $d_2$, is detected by the non-contacting optical readout of the present invention. In turn, the resulting fringe shift measured by the present invention is correlated to a particular type and particular quantity of radiant energy, thus giving the user of (or the system using) the present invention valuable information concerning the type and/or quantity of radiant energy detected. As previously mentioned, such a novel detector finds applications in at least the fields of thermal imaging, surveillance and laser detection.

Figure 10:
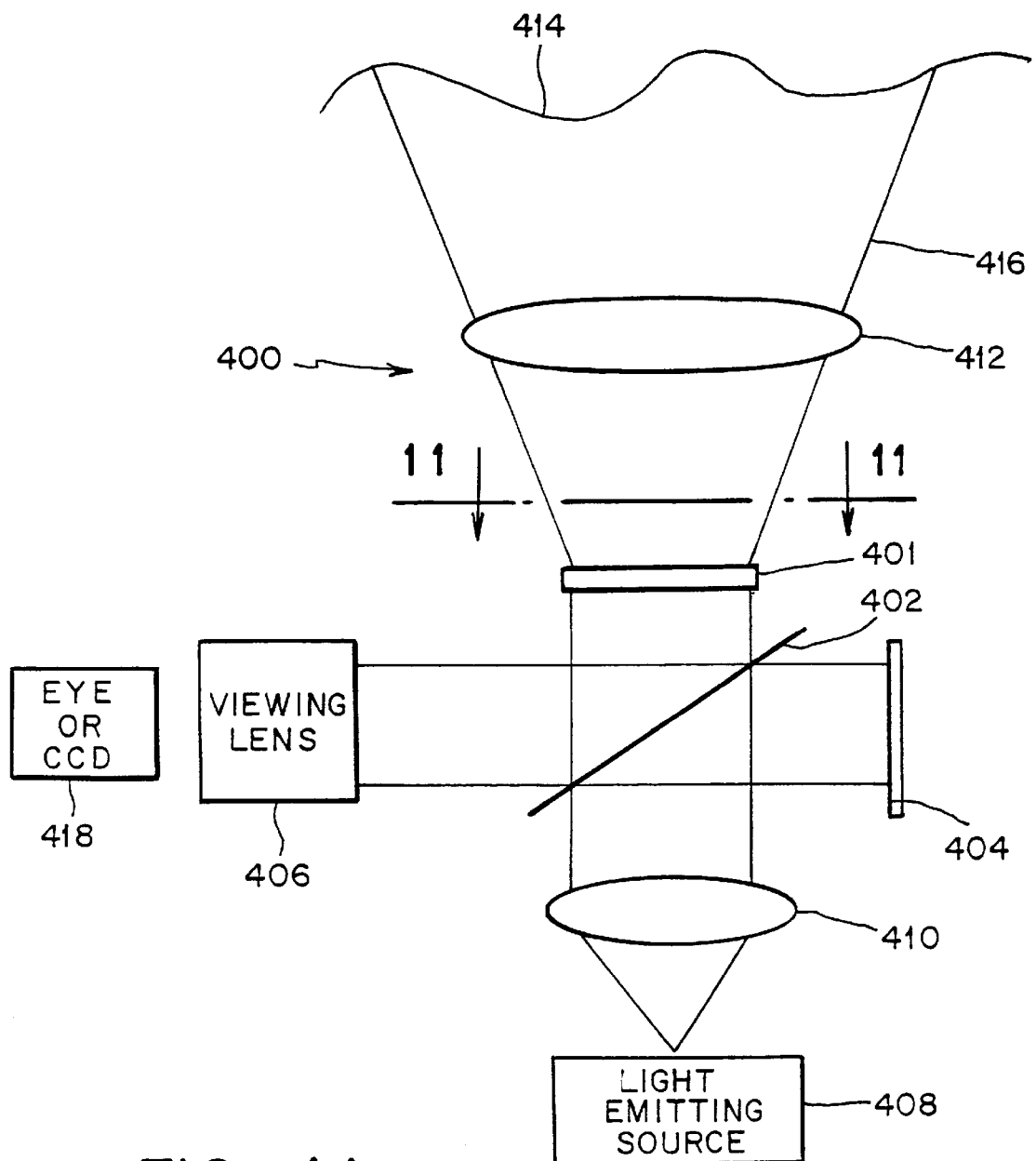
FIG. 10 is a functional side view of a system for imaging radiant energy associated with a thermal scene, utilizing a non-contacting optical readout, formed in accordance with the present invention.
Figure 11:
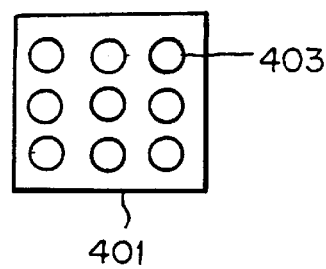
FIG. 11 is a top plan view, taken along line 11—11, of the focal plane array illustrated in FIG. 10.

Referring now to FIG. 10, a system 400 for imaging radiant energy associated with a thermal scene 414, utilizing a non-contacting optical readout, formed in accordance with the present invention is illustrated. The system 400 includes a focal plane array 401. It is to be appreciated that the focal plane array 401 is composed of a number of detecting elements 403. Each detecting element 403, formed in accordance with the present invention, is fabricated and functions in exactly the same manner as the detecting element 1 previously described with respect to the uncooled background limited detectors 100, 200 and 300, respectively illustrated in FIGS. 4, 7 and 9. Each detecting element 403 also includes a detector enclosure (not shown) similar to the detector enclosure described with respect to the detector 300. Additionally, it is to be appreciated that because thin film evaporation techniques are used to obtain the desired surface resistance for the metal film (i.e., approximately 189 ohms/square) of each detecting element 403, the focal plane array is highly uniform. Further, FIG. 11 shows a top plan view (along line 11—11 of FIG. 10) of a focal plane array, 401 having nine detecting elements 403; however, it is to be appreciated that the number of detecting elements contemplated to be within the scope of a focal plane array formed in accordance with the present invention is not so limited.

Accordingly, the system 400 is composed of a focal plane array 401, itself composed of a number of detecting elements 403 as previously mentioned, a beam splitter 402, a mirror 404, a viewing lens 406, a light emitting source 408 (e.g., such as a monochromatic LED), a focusing lens 410 and an imaging lens 412. Particularly, the imaging lens 412 is positioned between the focal plane array 401 and the thermal scene 414. The beam splitter 402 is positioned, in relation to the focal plane array 401, whereby a number of distances, $d_1$ through $d_n$, respectively exist between the beam splitter 402 and each of the detecting elements 403 (i.e., where n is the number of detecting elements in the focal plane array). The mirror 404 is positioned at a distance d from the beam splitter 402 and perpendicular in relation to the focal plane array 401. Further, the viewing lens 406, which is illustrated as an eyepiece in this preferred embodiment, is positioned opposite to the mirror 404 with the beam splitter 402 positioned therebetween. The light emitting source 408 is positioned opposite to the focal plane array 401 with the beam splitter 402 positioned therebetween. Lastly, the focusing lens 410 is positioned between the light emitting source 408 and the beam splitter 402.

Given the above-described structural definition of the system 400, illustrated in FIG. 10, the operation of the system 400 will now be described. It is to be understood that the imaging lens 412 passes the radiant energy associated with the thermal scene 414 to the focal plane array 401. Thus, the imaging lens 412 provides the system 400 with a system field of view 416. Subsequently, each one of the detecting elements 403 of the focal plane array 401 substantially absorbs the radiant energy passed by the imaging lens 412 and incidentally introduced to each detecting element's respective metal film. Further, each one of the detecting elements 403 structurally changes in response thereto. It should be understood that such a structural change refers to the linear expansion and subsequent sag associated with the membrane and metal film of each detecting element 403. The non-contacting optical readout that forms a part of the system 400 operates in a manner similar to the non-contacting optical readout illustrated in FIG. 9. However, the significant difference is that the non-contacting optical readout of the system 400 senses the structural change associated with each detecting element 403, while the non-contacting optical readout of FIG. 9 senses the structural change to the single detecting element 1.

Accordingly, the light emitting source 408 emits a light beam (not shown) toward the beam splitter 402. Next, the beam splitter 402 splits the light beam, emitted by the light emitting source 408 and passing through the focusing lens 410, into a transmitted beam portion (not shown) and a reflected beam portion (not shown) in a manner similar to that shown in FIG. 9. The transmitted beam portion is transmitted through the beam splitter 402 and strikes the detecting elements 403. In turn, each detecting element 403 reflects an imaging beam (not shown) back toward the beam splitter 402, whereby the beam splitter 402 then substantially reflects the imaging beams toward the viewing lens 406. It should be understood that a portion of each of the imaging beams, which strike the beam splitter 402, are also transmitted through the beam splitter 402; however, these portions of the imaging beams do not significantly affect the functioning of the present invention.

Further, the reflected beam portion is reflected by the beam splitter 402 and strikes the mirror 404. In turn, the reflected beam portion reflects back toward the beam splitter 402, whereby the beam splitter 402 then substantially transmits the reflected beam portion toward the viewing lens 406. Again, it is to be appreciated that a portion of the reflected beam portion, which strikes the beam splitter 402 on its return trip, is also reflected by the beam splitter 402; however, this portion does not significantly affect the functioning of the present invention. It is to be understood that, for the sake of clarity, neither the light beam, the transmitted beam portion, the reflected beam portion, nor the reflected imaging beams, is illustrated in FIG. 10; however, these beams follow similar paths to those illustrated in FIG. 9.

Next, the reflected beam portion and the imaging beams are received by the viewing lens 406. The reflected beam portion and each of the imaging beams exhibit respective interference patterns, whereby the interference patterns form a visual representation of the thermal scene 414. This visual representation of the thermal scene 414 may be observed by a human eye 418 looking through the viewing lens 406. As with the interference pattern discussed with respect to the detector 300 of FIG. 9, the interference patterns generated in the embodiment of FIG. 10 depend on the respective differences between the distances $d_1$ through $d_n$ (i.e., respective distances between the detecting elements 403 and the beam splitter 402) and the distance d (i.e., distance between the mirror 404 and the beam splitter 402). Again, depending on the respective differences, the reflected beam portion and each imaging beam will interfere constructively or destructively. Therefore, like the single interference pattern observed with the detector 300 of FIG. 9, as the metal film of each detecting element 403 absorbs radiant energy from the thermal scene 414 causing its membrane, and, thus, its metal film, to experience a vertical displacement, the respective distances $d_1$ through $d_n$ between the detecting elements 403 and the beam splitter 402 will change. Accordingly, the respective differences between the distances $d_1$ through $d_n$ and distance d will change, resulting in respective changes in the optical intensity (i.e., fringe shifts) of the visual representation of the thermal scene 414 observed by the human eye 418. Thus, the observer, looking through the viewing lens 406, will be presented with an accurate visual representation of the thermal scene imaged by the system 400. Also, a low cost silicon charge coupled device (CCD) 418 may be utilized in place of the human eye in order to detect and provide the visual representation of the thermal scene in order that the visual representation may be advantageously recorded. Further, a liquid crystal display may be interfaced to the system to permit further viewing of the visual representation.

It is also to be appreciated that an alternative form of a focal plane array for detecting radiant energy associated with a thermal scene, which utilizes one of the non-contacting capacitive readout approaches previously discussed, is envisioned to be within the scope of the present invention. Such focal plane array 500 is illustrated in a top plan view in FIG. 12. It is to be appreciated that the focal plane array 500 is composed of a number of detectors 501. While only nine detectors are shown, it is to be understood that the present invention is not so limited. Each detector 501 is fabricated and functions in exactly the same manner as the detector 100 previously described with respect to FIG. 4. Alternatively, each detector 501 may be fabricated and function in exactly the same manner as detector 200 of FIG. 7. In other words, each detector 501 is composed of a detecting element and a non-contacting capacitive readout. In a preferred embodiment, the readout is the differential capacitive readout whereby the electrodes of each detector are connected to a differential bridge measurement circuit (not shown) as previously described.

Figure 13:
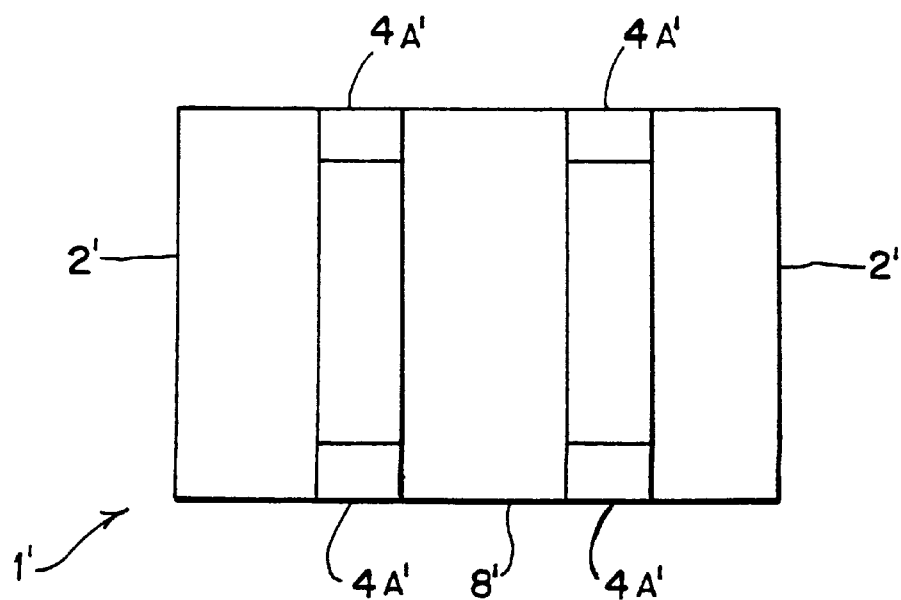
FIG. 13 is a top plan view of a detecting element employed in a focal plane array formed in accordance with the present invention.

Still further, in order to reduce the overall size of the focal plane array 500, the individual size of each detector 501 should preferably be reduced. The present invention provides an approach for doing so which includes forming a detecting element reduced in overall area. Specifically, the present invention provides for the fabrication of a focal plane array having an area of approximately 4 square millimeters (mm²). Such an array may be fabricated with detecting elements that are approximately 50 micrometers ($\mu$m)×50 micrometers ($\mu$m) in size. Such a detecting element 1' is illustrated in a top plan view in FIG. 13. Specifically, the metal film 8' is reduced in overall area, while the membrane 4' may preferably be in the form of struts 4A'. The struts 4A', preferably four in number, each have a first end and an opposite second end which are respectively connected to the substrate 2' and the metal film 8' as illustrated in FIG. 13. In this manner, the detecting element 1' may be fabricated in a reduced size while still providing the advantages of the present invention described herein.

However, it is to be appreciated that when reducing the size of the detecting elements in a detector that utilizes the non-contacting capacitive readout approach, the capacitance changes that occur when the detector is operating will also be proportionately reduced. Nonetheless, such reduction in capacitance may be advantageously compensated for, particularly in the differential capacitive readout, by increasing the frequency associated with the reference sine wave signal provided by the generator G. Accordingly, a practical focal plane array employing detecting elements formed utilizing the non-contacting capacitive readout approach may advantageously be fabricated in accordance with the present invention.

Figure 12:
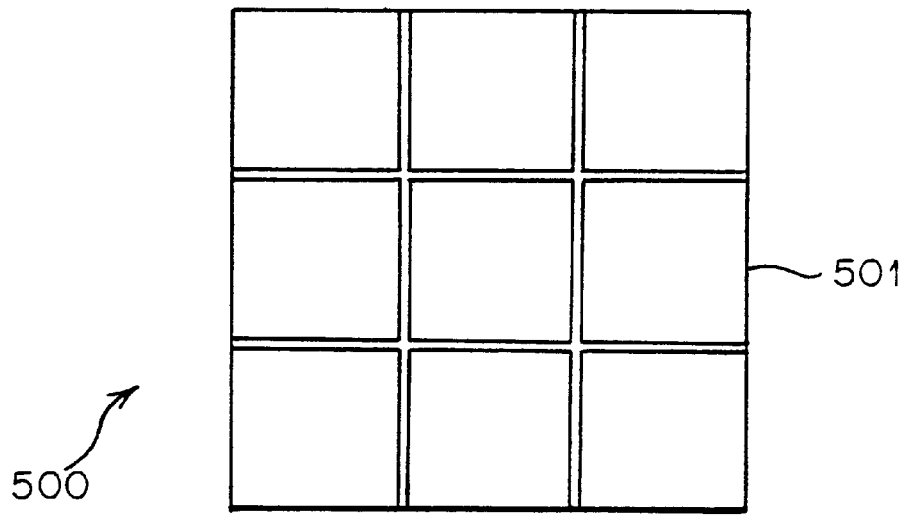
FIG. 12 is a top plan view of a focal plane array for detecting radiant energy associated with a thermal scene, utilizing detectors employing non-contacting differential capacitive readouts, formed in accordance with the present invention.

It is to be further understood that a focal plane array may be formed similar to the array illustrated in FIG. 12 whereby, instead of the differential bridge measurement circuit, the differential capacitive readout of each detector is electrically connected to an oscillator circuit, as previously described, whereby the frequency of oscillation associated with the oscillator, responsive to changes in the capacitance of the equivalent capacitors, is indicative of the radiant energy detected by each detector. In general, each detector of the array preferably generates one pixel of the thermal scene being imaged, while an entire representation of the thermal scene is provided by the focal plane array.

As previously mentioned, the radiant energy detector of the present invention is not only uncooled but also background limited. The fact that background limited performance (i.e., BLIP) is attained by an uncooled detector is one of the advantages that the present invention possesses over all prior art detectors. In general, BLIP is related to the thermal fluctuations of heat loss or gain between the radiant energy absorbing element and the detector heat sink. In the case of the present invention, BLIP relates to the thermal fluctuations between the detecting element 1 and the background, or immediate environment, of the detecting element 1.

Generally, the total mean square power fluctuation, for a radiant energy detector, due to all thermal contributors can be represented as:

$$<P_T^2>=<P_{CON}^2>+<P_{PH}^2>+<P_{JOHN}^2>$$

where $P_T$ is the total thermal fluctuation, $P_{CON}$ is the thermal fluctuation term due to thermal conductance, $P_{PH}$ is the thermal fluctuation term due to radiant energy (i.e., photon) exchange between the detecting element and its background, and $P_{JOHN}$ is the thermal fluctuation term due to Johnson noise. It is to be appreciated that for the present invention, both the Johnson noise thermal fluctuation term and the thermal fluctuation term due to thermal conductance are substantially zero due to the elimination of contact leads, as previously described, between the detecting element and the detector readout. Thus, the only term remaining is the thermal fluctuation term due to the radiated photon exchange between the detecting element and its background.

Under these conditions the conductive mean square power fluctuation, via radiation, can be defined as:

$$<P_{PH}{}^2>=4kT^2GB$$

where k is referred to as Boltzmann's constant and is equal to $1.38 \times 10^{-23}$ joules/degree Kelvin (J/°K), T is the temperature at 300° K, G is the thermal conductance of a black body in watts/degree Kelvin (W/°K), and B is the bandwidth term, in hertz (Hz), corresponding to the detected radiant energy. Further, it is to be appreciated that the power radiated from a black body radiator can be defined as:

$$W=\epsilon \sigma A T^4$$

where $\epsilon$ represents background emissivity, $\sigma$ is referred to as the Stefan-Boltzmann constant and is equal to $5.67 \times 10^{-8}$ watts/square meter×degrees Kelvin$^4$ (W/m$^2$K$^4$), and A is the area of the black body radiator. Further, it is to be appreciated that the term $\sigma T^4$ is equal to $4.64 \times 10^{-2}$ watts/square centimeter (W/cm$^2$).

Accordingly, because the thermal conductance, G, of a black body radiator can be represented in the following manner:

$$G=dW/dT=4\epsilon \sigma A T^3$$

the conductive mean square power fluctuation can be redefined as:

$$<P_{PH}{}^2>=4kT^2GB=16k\epsilon \sigma A T^5 B$$

It is to be appreciated that because the detecting element of the present invention is thermally coupled to its background, the power absorbed from, or by, the detecting element of the present invention can be defined as:

$$NEP=<16k\epsilon \sigma A T^5 B>^{1/2}/\epsilon$$

where NEP stands for the noise equivalent power and where it is assumed that the detector and the background have the same emissivities. Given this relationship, the detector sensitivity, which as previously mentioned is the figure of merit for a radiant energy detector, can be defined as:

$$D^*=\sqrt{AB}/NEP=\epsilon^{1/2}/4\sqrt{+e,rad} \, k\sigma T^{5+ee}$$

It is to be understood that more general relationships can be derived when the background and the detecting element have different emissivities; however, the concept as described herein does not change. Thus, it can be seen that for an emissivity, $\epsilon$, of 0.5 and a temperature, T, equal to 300°K, the detector sensitivity, $D^*$, is equal to approximately $1.27 \times 10^{10}$ cm-Hz$^{1/2}$/W.

It is to be appreciated that a radiant energy detector formed in accordance with the present invention, and, thus, a focal plane array utilizing such novel detectors, may achieve the above-mentioned detector sensitivity of approximately $1.27 \times 10^{10}$ cm-Hz$^{1/2}$/W and, accounting for the transmission percentage of the transparent electrodes utilized in the non-contacting differential readout, such detector or array may achieve a detector sensitivity of approximately $1.2 \times 10^{10}$ cm-Hz$^{1/2}$/W. However, as is evident from the foregoing description, it is to be understood that the present invention is capable of achieving such a high degree of sensitivity without the need for costly and operationally-limited cryogenic cooling as is necessary in prior art detectors.

Surprisingly, as has been described herein, the detector, and, thus, the focal plane array of the present invention, achieve both uncooled and background limited (BLIP) operation by the novel utilization of non-contacting readout means. The non-contacting readout means of the present invention, such as the capacitive readouts (i.e., both the differential and non-differential capacitance measuring circuit) and the optical readout (i.e., optical measuring device), permit a detector configuration which eliminates the use of contacting leads associated with the detecting element. The elimination of such contact leads, in turn, eliminates the disadvantageous noise attributable to the thermal fluctuation associated with the thermal conductance of the contact leads. Thus, a detector or a focal plane array formed in accordance with the present invention which provides uncooled background limited performance as described herein, thereby overcoming the limitations of prior art detectors, finds novel applications in at least the areas of thermal imaging, surveillance and laser detection.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A system for imaging radiant energy associated with a thermal scene, the system comprising:

a focal plane array, the focal plane array including a plurality of uncooled background limited detectors which are thermally and electrically isolated;

an imaging lens, the imaging lens being positioned between the focal plane array and the thermal scene, the imaging lens passing the radiant energy associated with the thermal scene to the focal plane array, each one of the plurality of detectors of the focal plane array substantially absorbing the radiant energy passed by the imaging lens and incidentally introduced to the focal plane array, each one of the plurality of detectors structurally changing in response thereto;

a beam splitter, the beam splitter being positioned in relation to the focal plane array whereby a plurality of distances respectively exist between the beam splitter and the plurality of detectors;

a mirror, the mirror being positioned at a distance d from the beam splitter and perpendicular in relation to the focal plane array;

a viewing lens, the viewing lens being positioned opposite to the mirror with the beam splitter being positioned therebetween;

a light emitting source, the light emitting source being positioned opposite to the focal plane array with the beam splitter being positioned therebetween, the light emitting source emitting a light beam;

a focusing lens, the focusing lens being positioned between the light emitting source and the beam splitter;

the beam splitter splitting the light beam, emitted by the light emitting source and passing through the focusing lens, into a transmitted beam portion and a reflected beam portion;

the transmitted beam portion being transmitted through the beam splitter and striking the plurality of detectors, the plurality of detectors respectively reflecting a plurality of imaging beams back toward the beam splitter, the beam splitter then substantially reflecting the plurality of imaging beams toward the viewing lens;

the reflected beam portion being reflected by the beam splitter and striking the mirror, the reflected beam portion reflecting back toward the beam splitter, the beam splitter then substantially transmitting the reflected beam portion toward the viewing lens; and the reflected beam portion and the plurality of imaging beams passing through the viewing lens and respectively exhibiting a plurality of interference patterns, the plurality of interference patterns forming a visual representation of the radiant energy associated with the thermal scene, the plurality of interference patterns changing in response to a respective change in difference between the plurality of distances and the distance d, each one of the plurality of distances respectively changing, thereby causing a change in difference with respect to the distance d, as each one of the plurality of detectors experiences a structural change in response to absorbing the radiant energy associated with the thermal scene.

2. A system as defined in claim 1, further comprising a charge coupled device, the charge coupled device being positioned opposite the mirror with the viewing lens positioned therebetween, the charge coupled device being responsive to the plurality of interference patterns.

* * * * *